United States Patent [19]
McCann

[11] 4,110,615
[45] Aug. 29, 1978

[54] AUTOMATIC RADIOCHROMATAGRAM STRIP SCANNER

[76] Inventor: Robert L. McCann, 27 Thornton Pl., Mount Holly, N.J. 08060

[21] Appl. No.: 851,926

[22] Filed: Nov. 16, 1977

[51] Int. Cl.² .............................................. G01T 1/00
[52] U.S. Cl. ................................................. 250/328
[58] Field of Search ............... 250/303, 328, 374, 388, 250/364, 369; 424/1; 235/151.3

[56] References Cited
U.S. PATENT DOCUMENTS 3,200,252  8/1965  Moses et al. .......................... 250/328

*Primary Examiner*—Davis L. Willis
*Attorney, Agent, or Firm*—Caesar, Rivise, Bernstein & Cohen, Ltd.

[57] ABSTRACT

Apparatus for automatically scanning processed radiochromatagram strips. The apparatus comprises a carrier wheel having a processed chromatagram mounted on the periphery thereof by a strip of plastic tape. The wheel carries the processed chromatagram past a radiation detector. Photoelectric means are provided to provide signals indicative of the position of the carrier wheel. The apparatus includes electrical circuitry responsive to the signals produced by the radiation detector to provide a numerical display of the total radioactivity detected along the entire strip and for providing a numerical display of the radioactivity detected along a selected portion of the strip. A strip chart recorder is provided in the apparatus to produce a graphical display of the spectral distribution of the radioactivity along the entire strip. The apparatus includes logic means for controlling the functions of the apparatus to provide a completely automated system.

13 Claims, 15 Drawing Figures

AUTOMATIC RADIOCHROMATAGRAM STRIP SCANNER

This invention relates to the testing of radiopharmaceuticals and more particularly to apparatus for scanning processed radiochromatagram strips.

Radiopharmaceutical imaging agents are commonly used in the medical field for enabling radio imaging of various portions of the anatomy. Such agents typically comprise an organic compound having an affinity for a specific body organ, e.g., liver, kidney, lung, etc., which has been tagged with a suitable radioisotope. Technetium - 99m is readily available and is a commonly used isotope or tagging agent for radiopharmaceuticals. In this regard, see U.S. Pat. Nos. 3,872,226 (Haney et al), 3,875,299 (Winchell et al), 3,902,849 (Barak et al) and 4,017,596 (Ioberg et al), disclosing the use of Technetium 99 as a tagging agent for radiopharmaceuticals.

As is known, many radiopharmaceuticals which are to be tagged with Technetium contain small amounts of Stannous Chloride or Tin which reduces the Technetium from a valance state of $+7$ to a valance state of $+4$. It is in the reduced valance state that the Technetium labels the pharmaceutical for use as a diagnostic agent. Accordingly, it is probable that in any radiopharmaceutical tagged with Technetium, the Technetium exists in three forms. One form is the unreduced or free $+7$ valance Technetium. Another form is the reduced $+4$ valance Technetium. This form is not bound to the pharmaceutical carrier and is frequently referred to as the unbound or hydrolyzed form of Technetium. The last form of Technetium is in the reduced $+4$ valance state which is bound to the radiopharmaceutical carrier.

In order to ensure that the Technetium has properly tagged the carrier before introduction into the patient, test kits utilizing chromatagram strips have been used. Such strips enable one to calculate the percentage of free or unbound Technetium in the pharmaceutical. Ackerman Nuclear, Inc., markets one such kit under the name "TECH KIT". Another kit is made by General Radioisotope Products and sold as either the "MAC I" or the MAC II" and another kit is sold by New England Nuclear as the "MINI RADIOCHROMATOGRAPHY TESTING SYSTEM".

The use of the cold kit is as follows: a sample of the radioisotope to be tested is placed at a predetermined location (origin) on the strip. The strip is then placed into a measured amount of a solvent so that the solvent carries the pharmaceutical, via capillary action, the full length of the strip. The strip is then dried and subjected to scanning by a scintillation counter to determine the proportion of Technetium which has migrated past a predetermined point on the strip, which point is indicative of the existence of free or unbound Technetium. In tests for free Technetium the point is referred to as the $+7$ valance line whereas in tests for unbound or hydrolized Technetium the line is known as the $+4$ valance line. Once the chemical state of the radiopharmaceutical has been determined through the above procedure a prediction can be made on proper or improper biological behavior of the material prior to its use in the patient. In this regard, it is generally accepted that if the percentage of free or unbound Technetium in the tagged radiopharmaceutical is at least 5% the survey will be suspect or questionable and if it is at least 10% the tagged pharmaceutical is unusable.

While the above described cold kits are effective to indicate the efficacy of the tagged radiopharmaceutical their use leaves much to be desired from the standpoint of speed, efficiency, reliability and repeatability. While some chromatagraphic apparatus has been disclosed in the patent literature, such as U.S. Pat. Nos. 3,033,986 (Fowler et al) and 3,200,252 (Moses et al), such apparatus does not appear to overcome the drawbacks inherent in the prior art test kit procedure. Accordingly, it is a general object of this invention to provide a system for scanning processed radiochromatagram strips which overcomes the disadvantages of the prior art.

It is a further object of this invention to provide a fully automated system for scanning processed chromatagram strips to analyze the chemical structure of radiopharmaceuticals placed thereon.

It is still a further object of this invention to provide apparatus for automatically scanning processed chromatagram strips and providing a display of the data accumulated.

It is still a further object of this invention to provide apparatus for scanning processed chromatagram strips and automatically providing a digital display indicating the breakdown of the radiopharmaceutical thereon as well as a graphical representation of its spectral distribution.

It is yet a further object of this invention to provide automatic apparatus for processing chromatagram strips while said strips are wet.

These and other objects of the instant invention are achieved by providing apparatus for automatically scanning processed chromatagrams of radiopharmaceuticals to provide an indication of the biological behavior of the radiopharmaceuticals. The apparatus comprises a sample carrier adapted to receive a processed chromatagram. Radioactivity detecting means are provided for counting the radioactive emissions of a sample disposed on the carrier. The carrier is moved relative to the radioactive detector so that the detector traverses the chromatagram to count the radioactive emissions thereof and provide output signals indicative of the spectral distribution of the radioactivity along the chromatagram. Display means, responsive to the output signal, provide a digital readout of the number of emissions detected in the entire chromatagram as well as the number of emissions detected within a preselected portion thereof. Recorder means are provided responsive to the output signals to produce a graphic record of the spectral distribution of the radioactive emissions across the entire chromatagram.

In accordance with one aspect of the invention the chromatagram, while wet, is sealed within a plastic tape and mounted on the carrier.

Other objects and many of the attendant advantages of this invention will be readily appreciated as the same becomes better understood by reference to the following detailed description when considered in connection with the accompanying drawing wherein.

Figure 1:
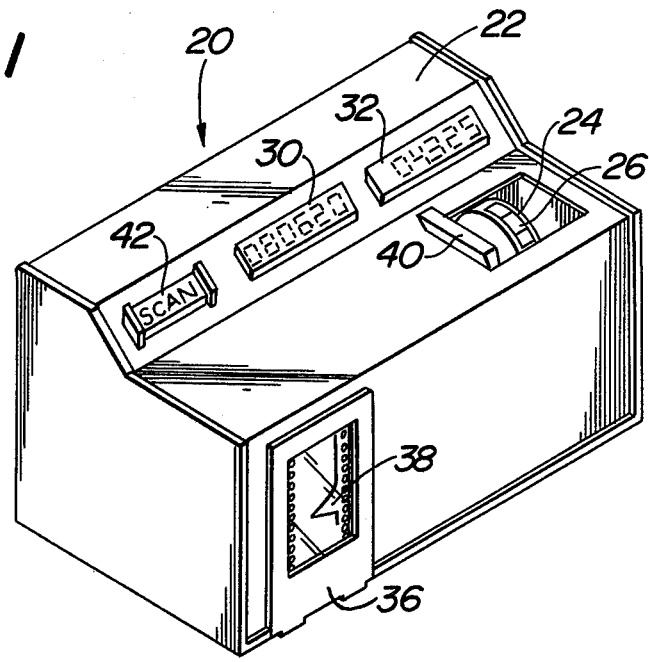
FIG. 1 is a perspective view of the automatic radiochromatagram strip scanning apparatus of the instant invention.
Figure 3A:
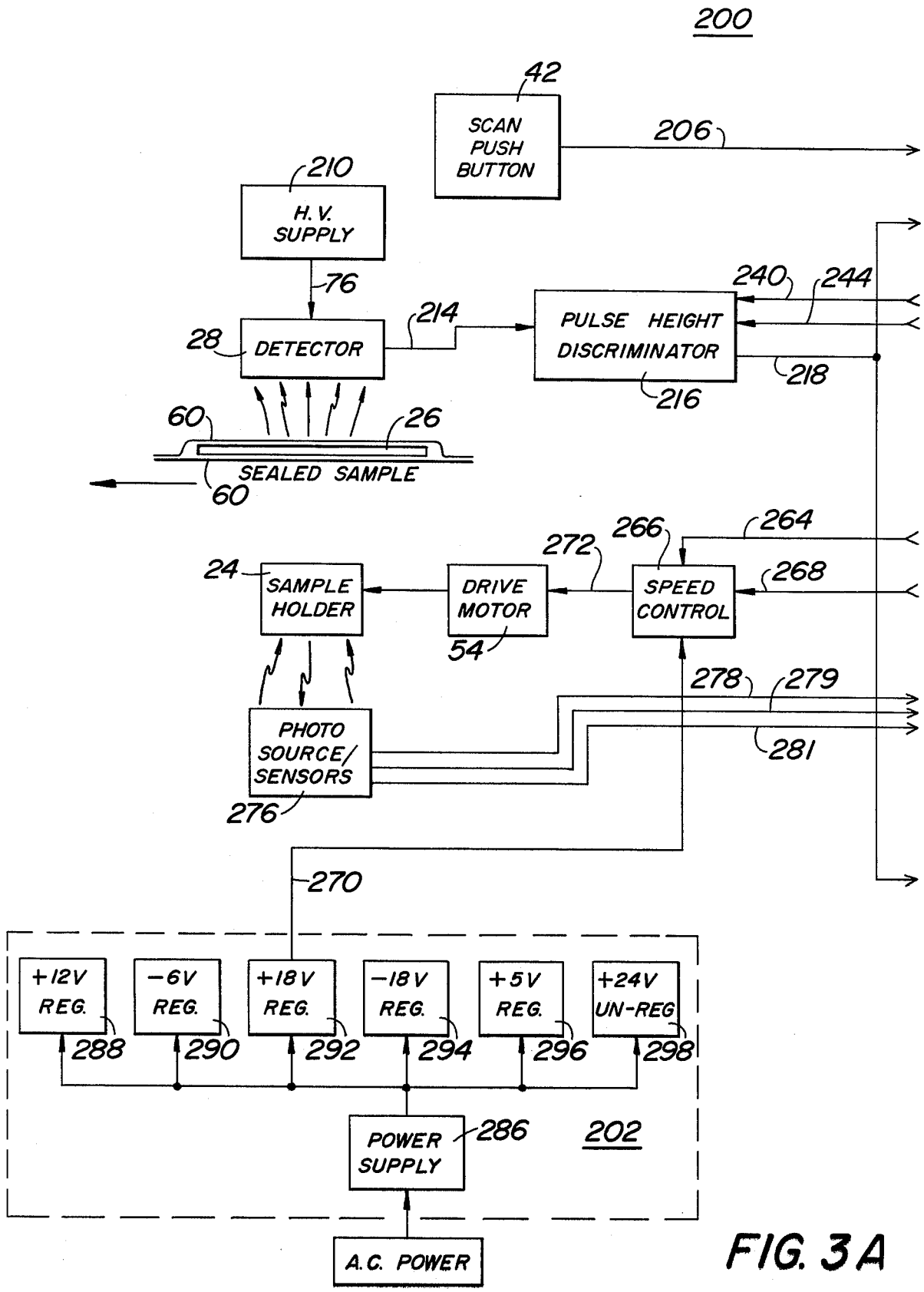
Figure 3B:
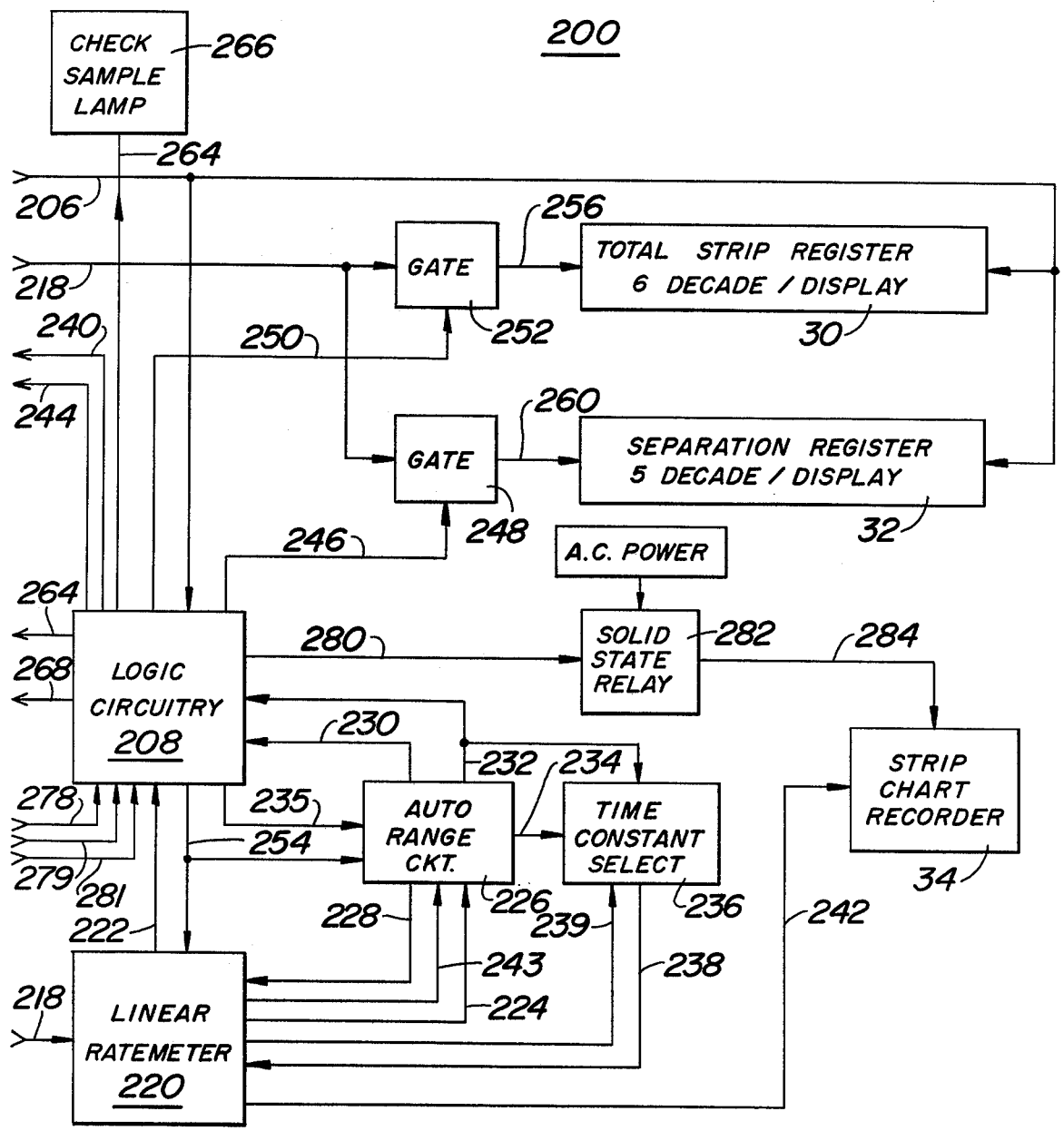
Figure 4:
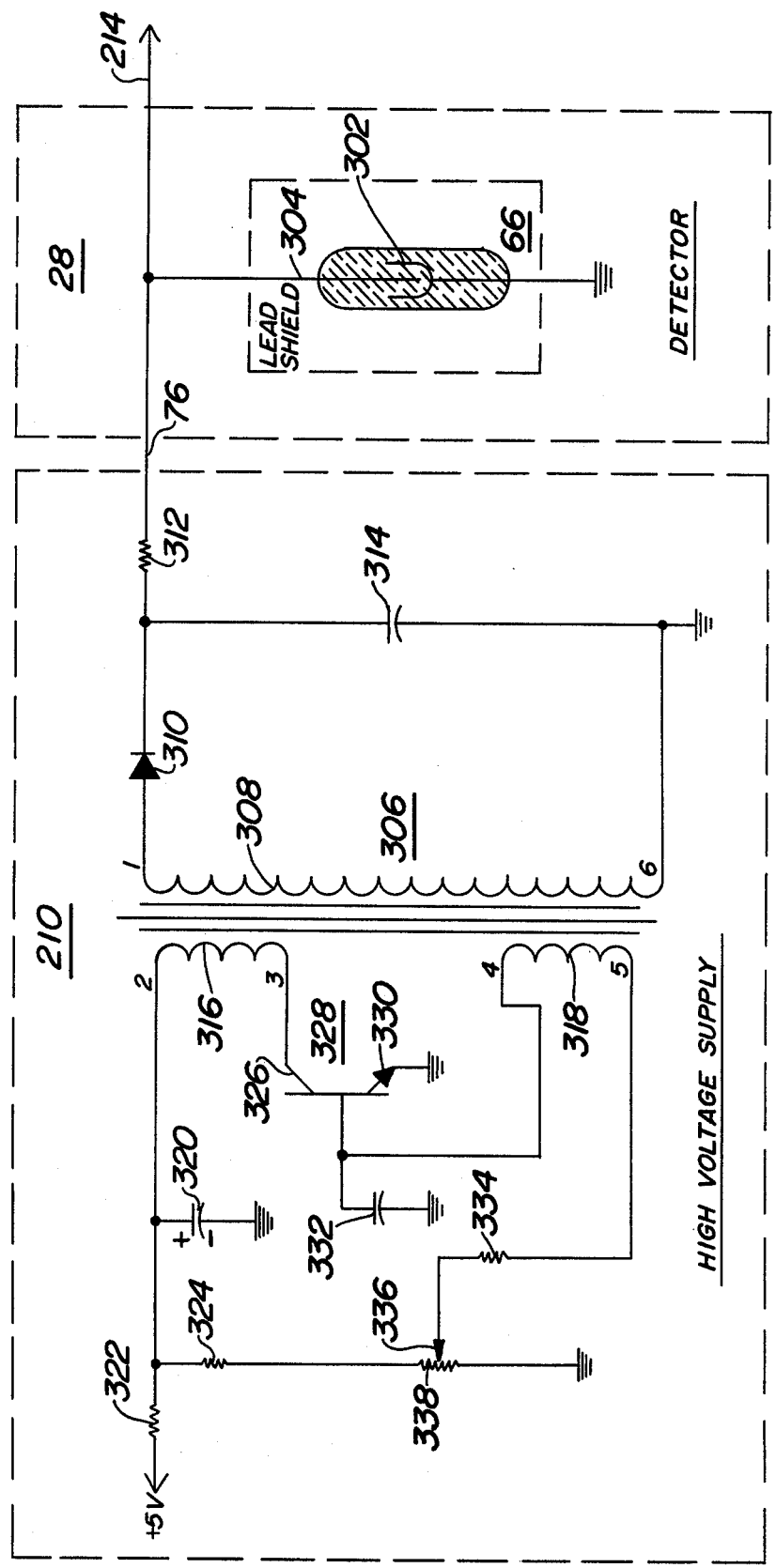
Figure 5:
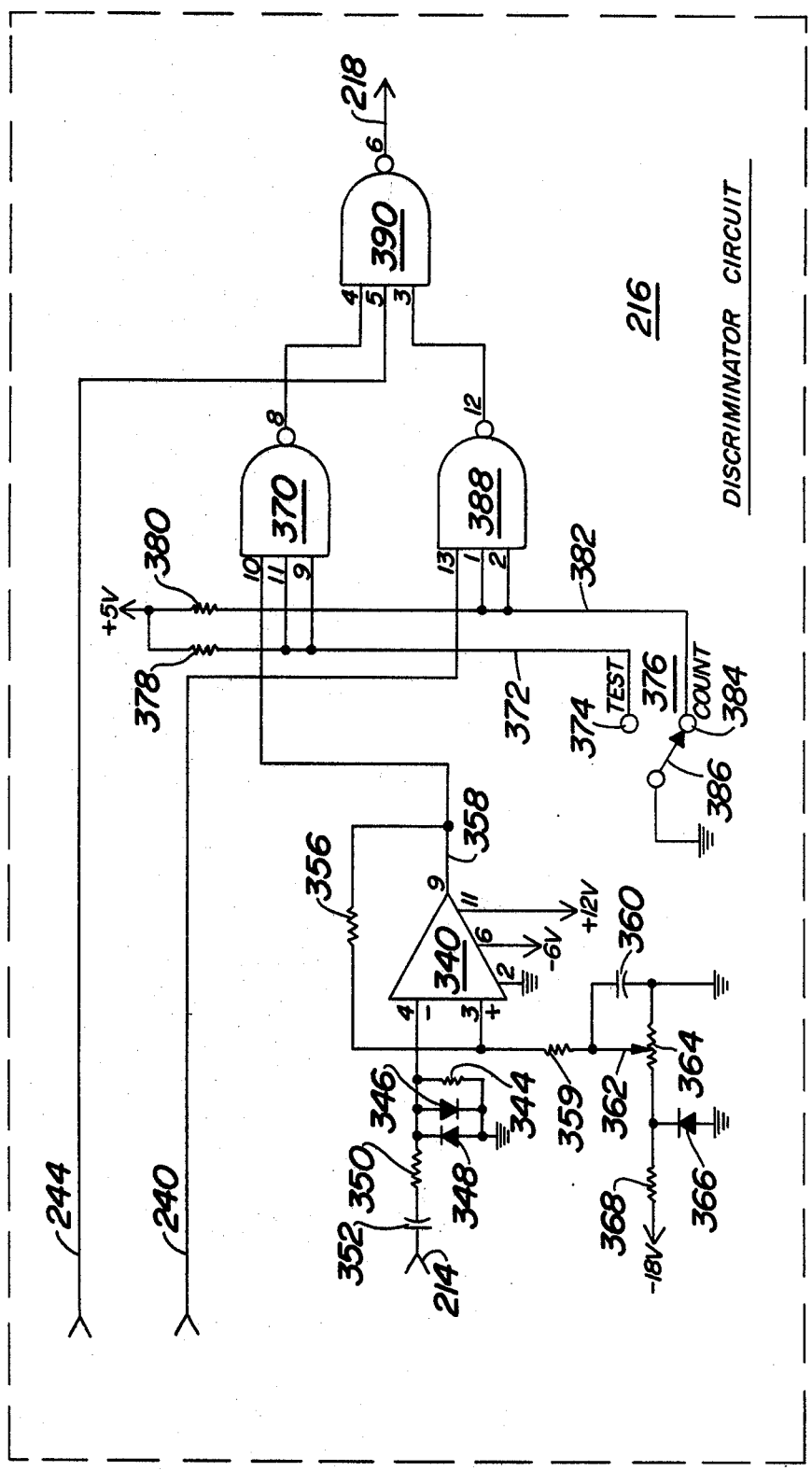
Figure 6A:
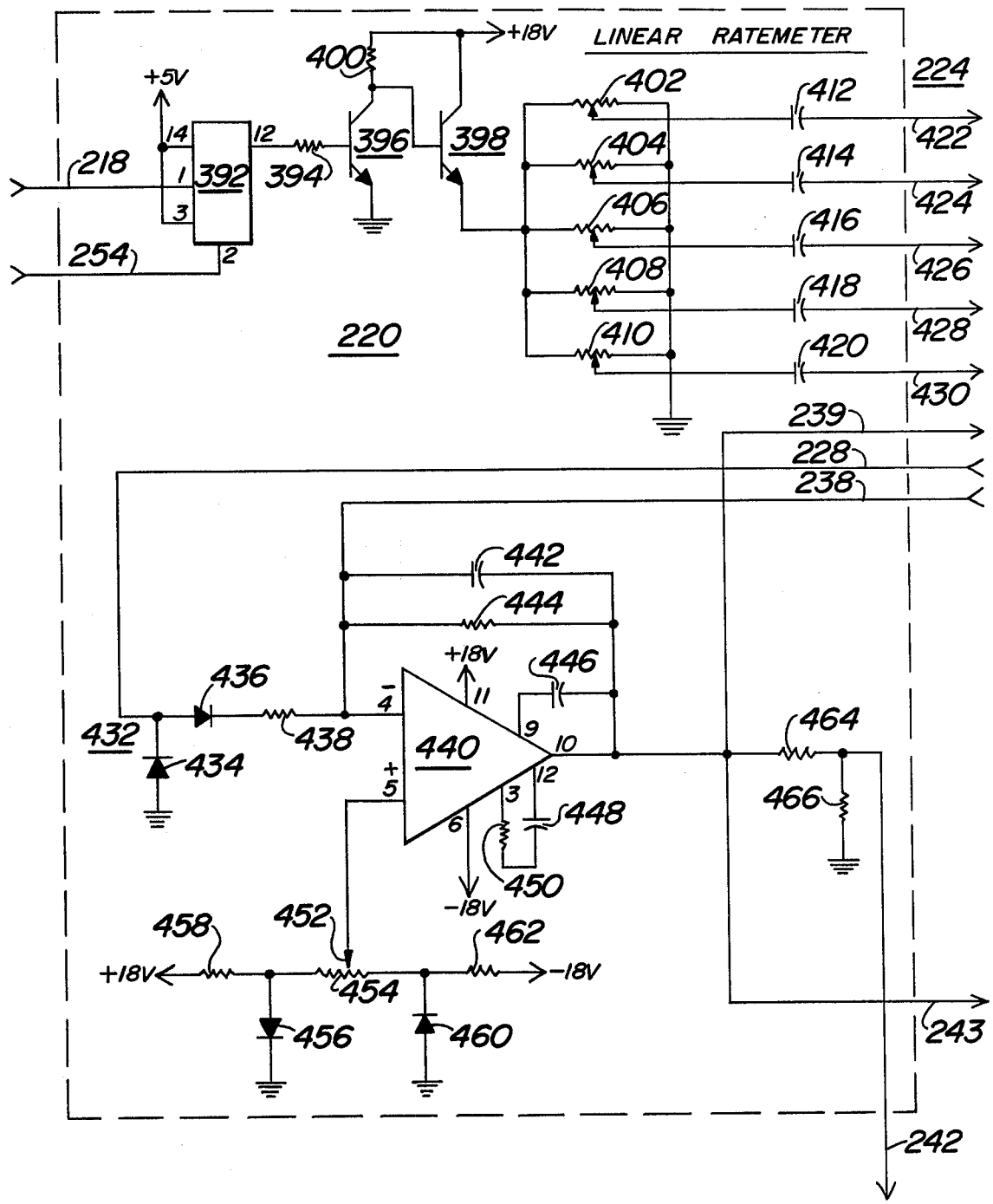
Figure 6B:
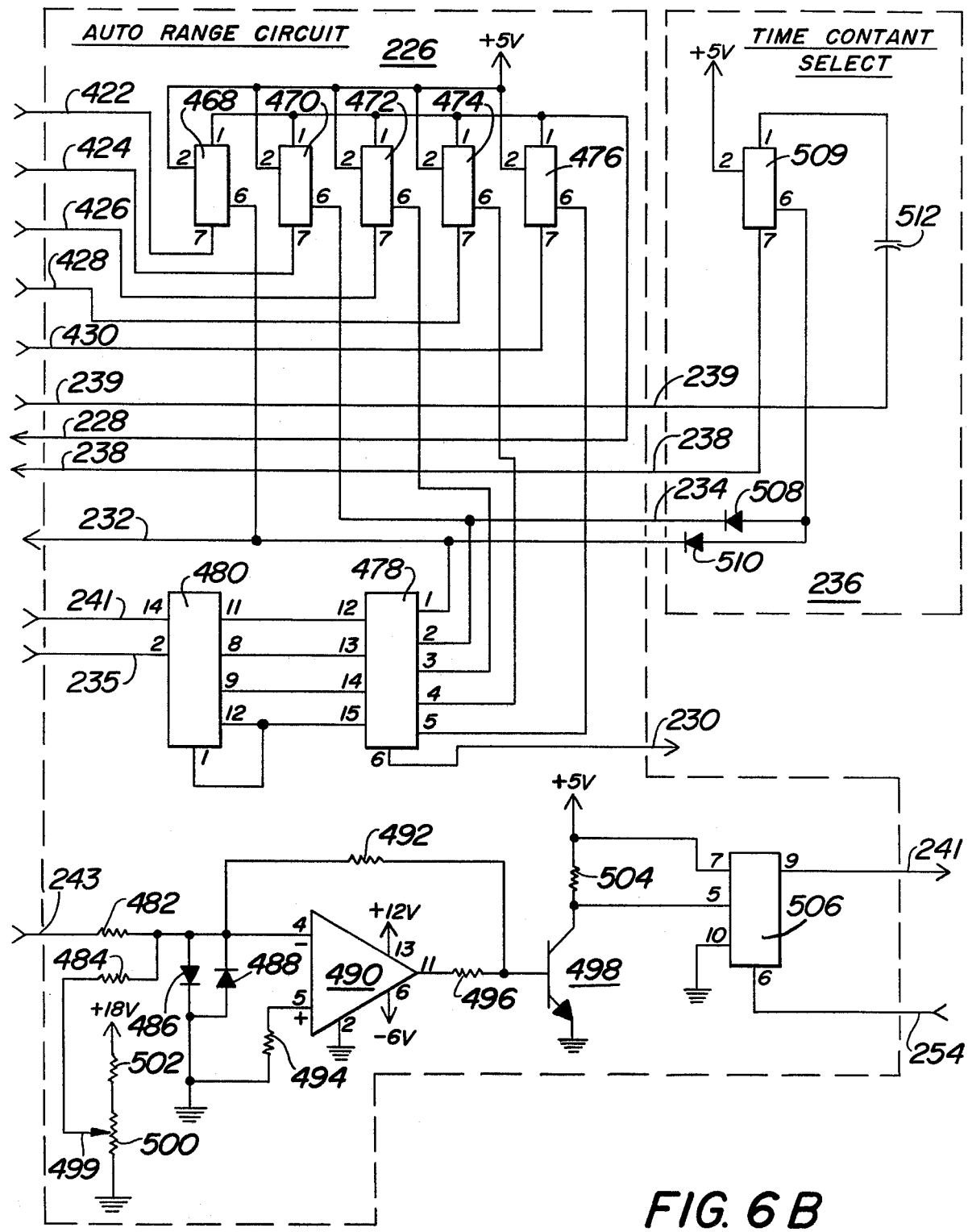
Figure 7A:
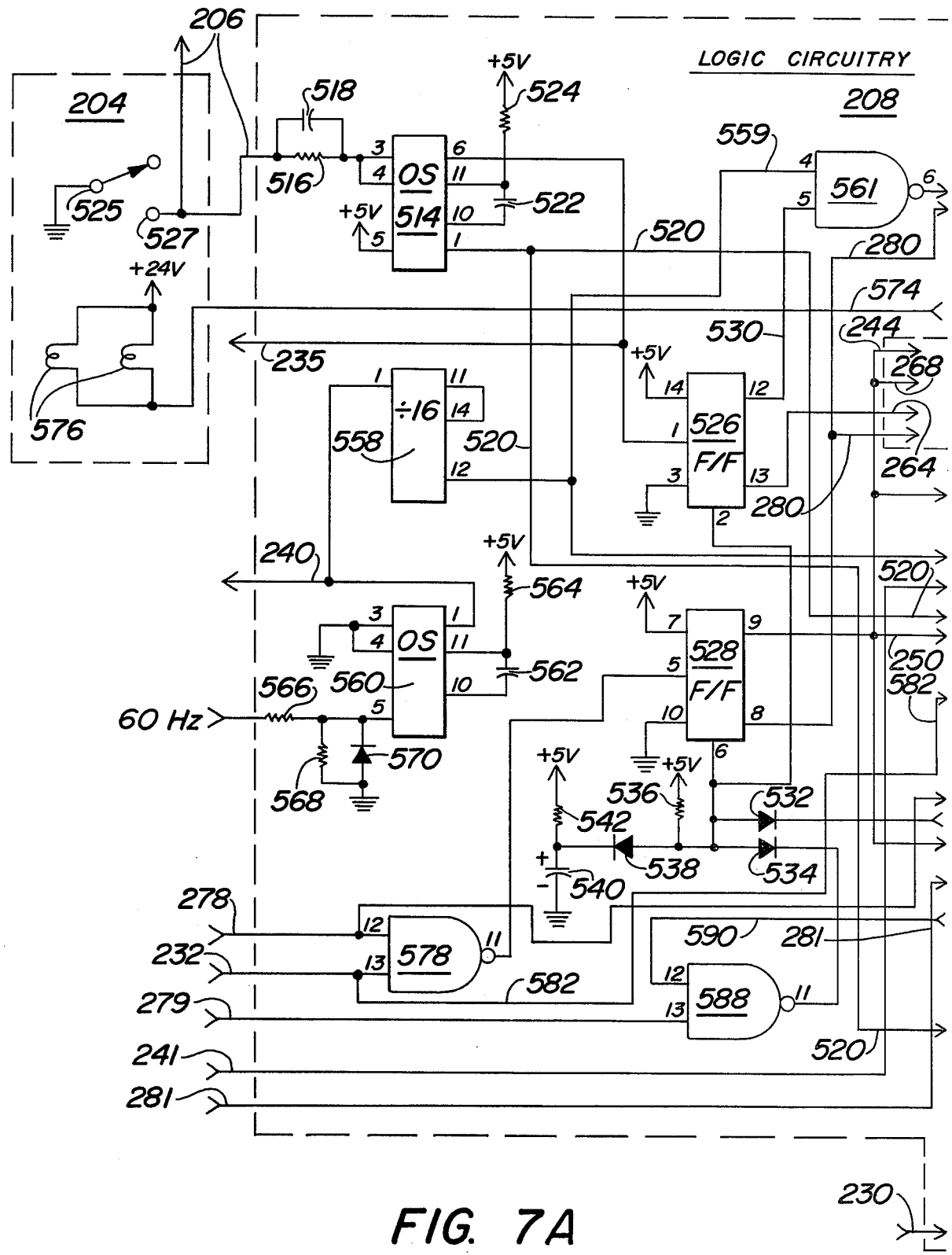
Figure 7B:
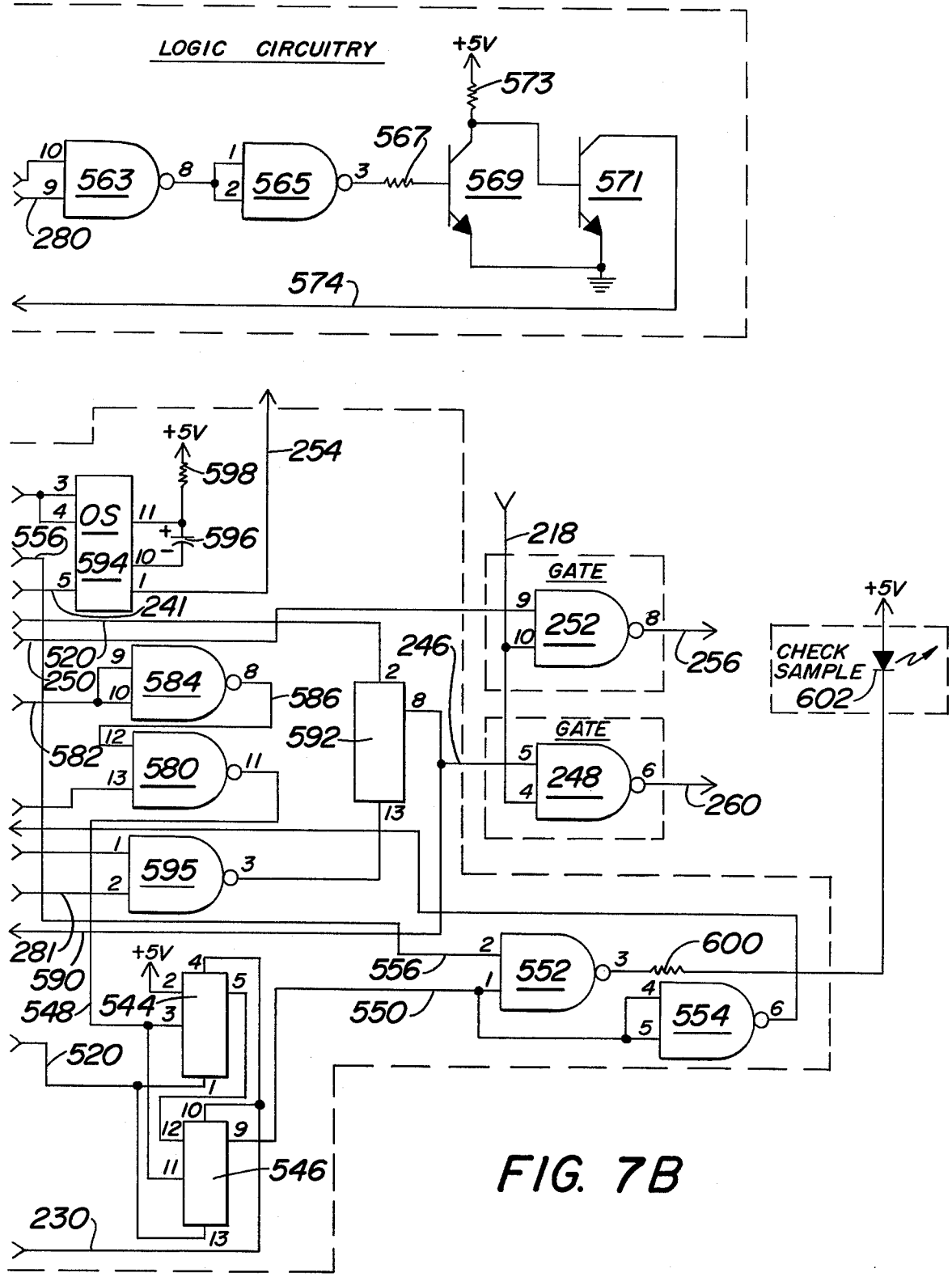
Figure 8:
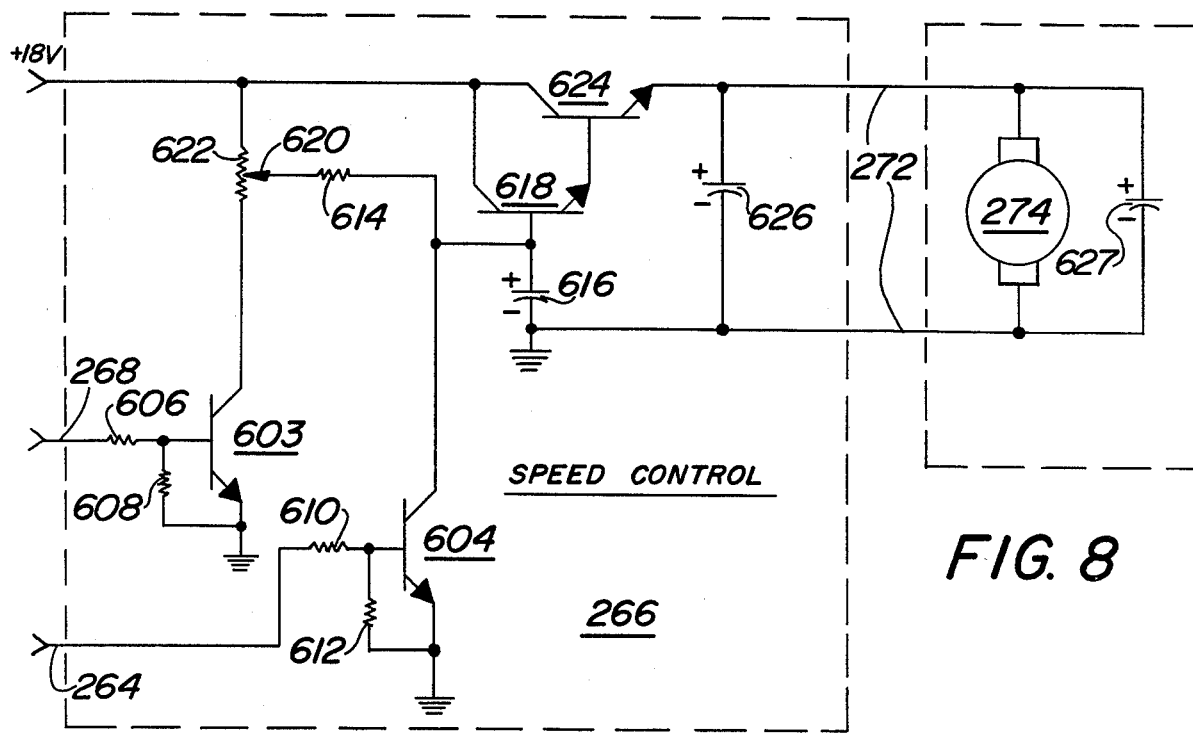
Figure 9:
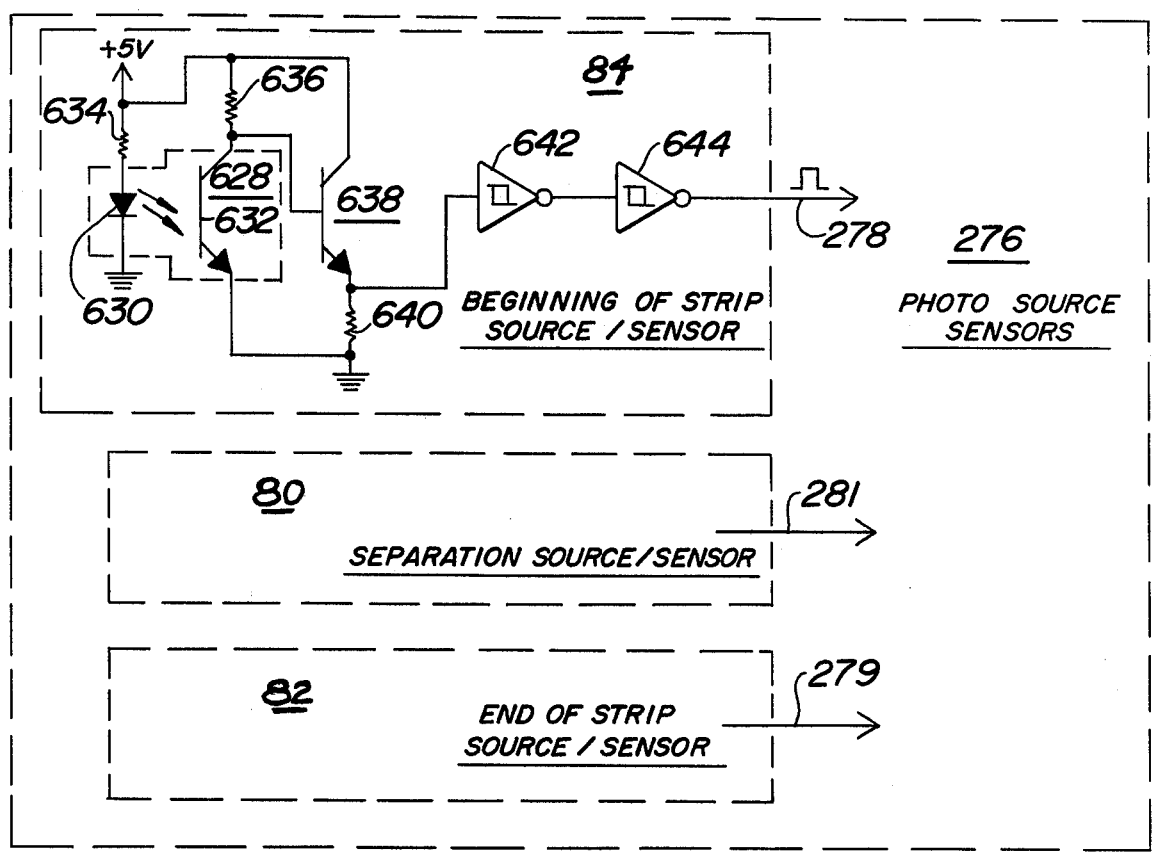
Figure 10:
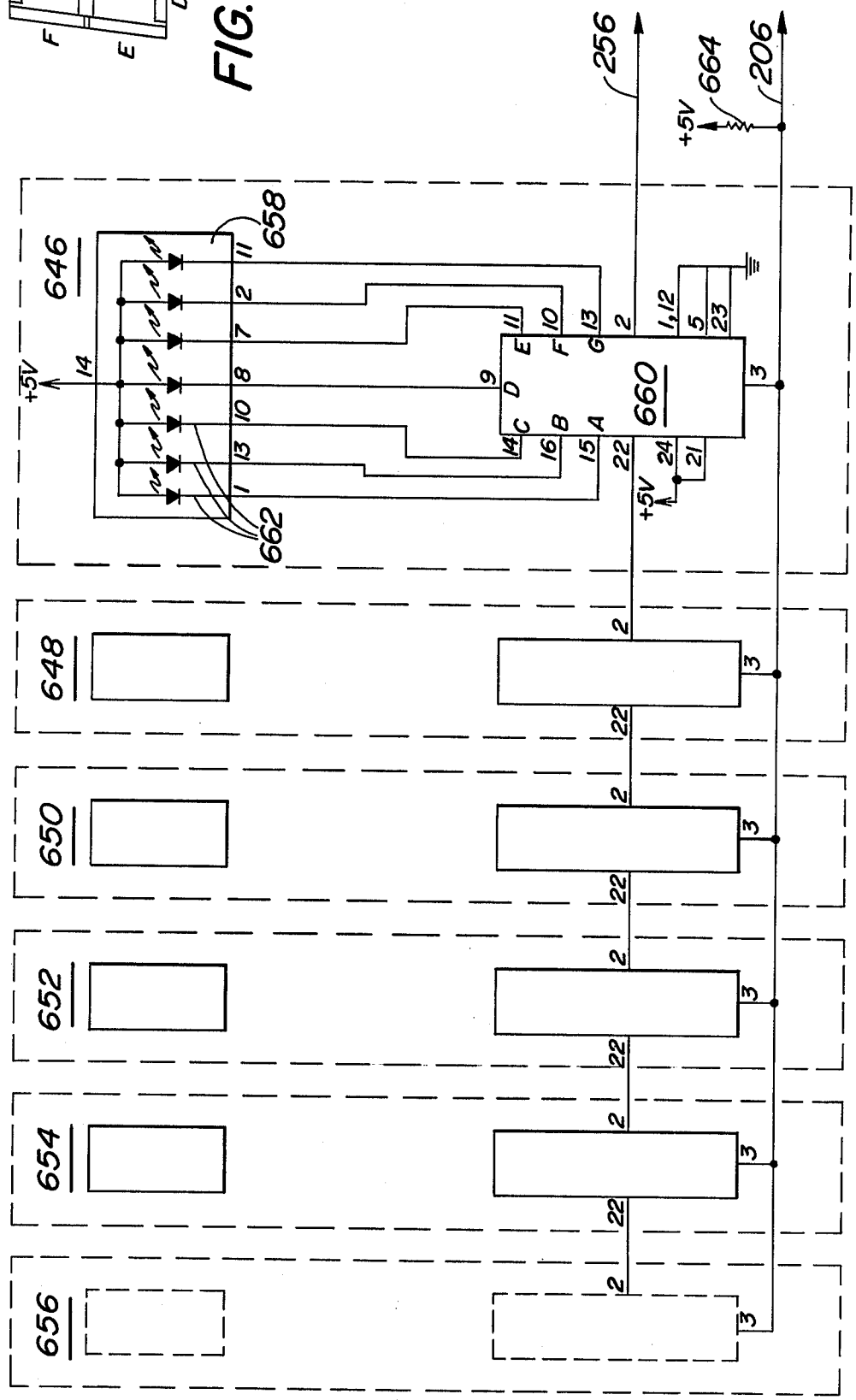
Figure 10A:
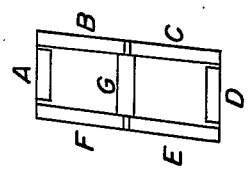

FIG. 3, comprising FIGS. 3A and 3B, is functional block diagram of the apparatus of the instant invention;

FIG. 4 is a schematic diagram of a portion of the circuitry shown in FIG. 3A;

FIG. 5 is a schematic diagram of a portion of the circuitry shown in FIG. 3A;

FIG. 6, composed of FIGS. 6A and 6B, is a schematic diagram of a portion of the circuitry shown in FIG. 3B;

FIG. 7, composed of FIGS. 7A and 7B, is a schematic diagram of a portion of the circuitry shown in FIG. 3B;

FIG. 8 is a schematic diagram of a portion of the circuitry shown in FIG. 3A;

FIG. 9 is a schematic diagram of a portion of the circuitry shown in FIG. 3A;

FIG. 10 is a schematic diagram of a portion of the circuitry shown in FIG. 3B; and FIG. 10A is a front elevational view of one element of the numerical display shown in FIG. 1.

Referring now to the various figures of the drawing wherein like reference characters refer to like parts, an automatic radiochromatagram strip scanner of the instant invention is shown generally by the reference numeral 20 in FIG. 1. The apparatus 20 is arranged to scan a processed chromatagram strip while such strip is wet to provide digital displays which indicate the breakdown of the radiopharmaceutical under test, while also providing a graph of the spectral distribution of the radioactivity across the strip. Accordingly, the operator of apparatus 20 can readily determine if the radiopharmaceutical on the chromatagram strip will exhibit proper biological activity.

The apparatus 20 of the instant invention can be used with any conventional processed chromatagram strip like sold by Ackerman, New England Nuclear and General Radioisotope Products, identified heretofore, or any other supplier.

As will be appreciated by those skilled in the art, chromatagram strips for use in analyzing Technetium tagged radiopharmaceuticals basically are of two types, depending upon the form of Technetium being assayed. For example, one type of strip, hereinafter referred to as an "A" strip is useful for determine the amount of "free" Technetium. To that end, the "A" strip includes an origin line marked on it at which a drop of the radiopharmaceutical under test is deposited and a +7 valance state separation line spaced approximately an inch away. After the strip has been processed any radioactivity sensed beyond the +7 separation line is indicative of the presence of some free Technetium. The other type of strip, hereinafter referred to as a "B" strip, is used for determining the amount of unbound or hydrolized Technetium. In the "B" strip the separation line, which represents a +4 valance state, is only approximately a quarter inch away from the origin line. Any radioactivity sensed between the origin and the +4 valance line is indicative of the presence of bound or unhydrolized Technetium.

As can be seen in FIG. 1, the apparatus 20 basically comprises a housing 22 in which a sample holding carrier wheel 24 is disposed. The wheel 24 is arranged to support a processed chromatagram strip 26 on its periphery and to carry the strip past a radioactive emission detector 28 (FIGS. 2A and 2B) located below the wheel. Electrical circuitry, to be described in detail later, is located within the housing and is arranged to monitor the output of the detector and to provide signals to a pair of numerical displays 30 and 32 located on the top of the housing.

The displays 30 and 32 are conventional light emitting diode displays. The display 30 includes six modules and display 32 includes five. The details of the displays 30 and 32 will be described in detail later. Suffice for now to say that display 30 is arranged to provide an indication of the total count as sensed by the detector along the entire length of strip 26 while display 32 provides a display of the counts sensed by the detector from the separation point on the strip until the end of the strip. Accordingly, for "A" strips the display 30 provides a numerical indication of the amount of free Technetium in the radiopharmaceutical under test. For "B" type strips the display 30 provides a numerical indication of the amount of bound Technetium in the radiopharmaceutical. By dividing the reading of the display 32 by the reading of the display 30 one can readily determine the percent of free or bound Technetium, as the case may be.

The apparatus 20 also includes a strip chart recorder 34 which is arranged to provide a graphical representation of the radioactive distribution across the entire length of the chromatagram strip 26. The recorder 34 is located within the housing and behind the door 36 in the front thereof. The door is pivotable to provide access to the strip chart 38 produced by the recorder 34. Access to the carrier wheel 24 is provided by a sliding door 40 located in the top of the housing.

The apparatus 20 is fully automatic and once the processed chromatagram strip 26 is mounted on the carrier wheel 24 all that is required to set the system into operation is the depression of a push button 42 located at the top of the housing adjacent to the display 30.

Figure 2A:
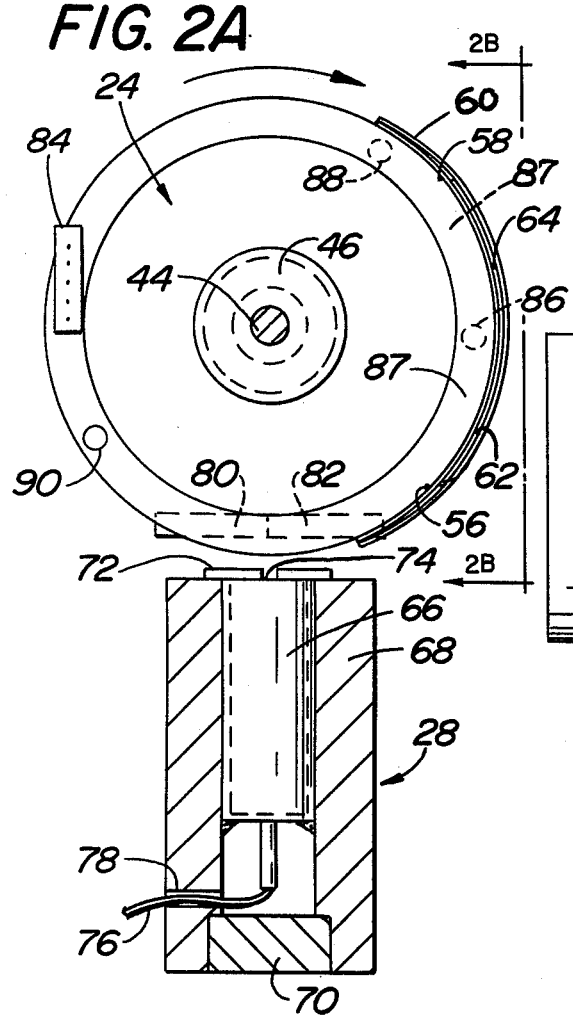
FIG. 2A is a side elevational view, partially in section, of a portion of the interior of the apparatus shown in FIG. 1.
Figure 2B:
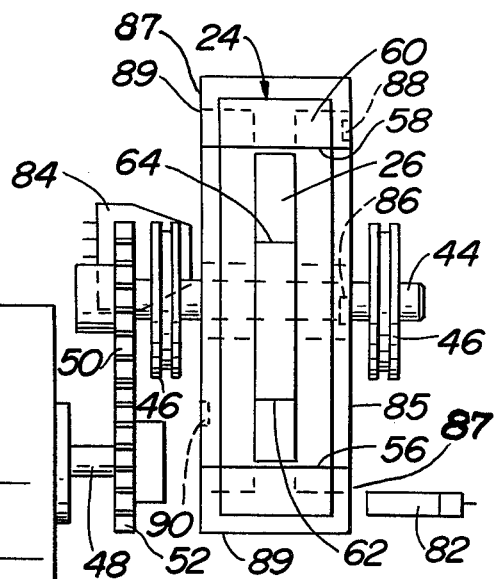
FIG. 2B is view taken along line 2B-2B of FIG. 2A.

The structural details of the carrier wheel 24 and its associated components is best seen by reference to FIGS. 2A and 2B. As can be seen, the carrier wheel 24 is a disc-like member, preferably formed of aluminum, which is mounted on a shaft 44 disposed horizontally and parallel to the front of the housing. The shaft is supported at each end within a pair of bearings 46 fixedly mounted within the housing. A gear 50 is mounted on one end of the shaft 44. The gear 50 engages another gear 52 which is mounted on the output shaft 48 of the motor 54. The motor is arranged such that when it operates it effects the rotation of the carrier wheel 24 about the axis of the shaft 44 in the direction of the arrow shown in FIG. 2A. As can be seen in FIG. 2B, the periphery of the carrier wheel includes a pair of lines 56 and 58 engraved therein. The line 56 acts as a guide for positioning the beginning end of the chromatagram strip 26 while the line 58 acts as a guide for the end of the strip.

In accordance with a preferred aspect of this invention the strip is totally sealed within a pair of coextensively sized tape strips. The strips are of greater size than the chromatagram strip 26 and are preferably formed of (Mylar (a registered trademark) or vinyl. Each tape strip has a non-residue producing adhesive on the underside thereof. A processed chromatagram strip, while still wet, is disposed on the top surface of one tape strip and the other tape strip is brought thereover so that its adhesive underside contacts the top surface of the bottom strip to thereby encase the wet chromatagram strip between it and the underlying strip. The encased chromatagram strip is then disposed on the periphery of the carrier wheel 24 between the guide lines 56 and 58 and is adhesively held in place by the adhesive on the underside of the bottom tape strip.

When the apparatus 20 is used for analysis of "A" type chromatagram strips, the strip 26 is disposed on the carrier wheel such that its origin line 62 is located closest to the beginning of strip line 56, while its +7 valance separation line 64 is located closest to the end of the strip line 58. When using the apparatus 20 with a "B" type strip, the strip is disposed on the carrier such that its origin line is located closest to the end of the strip line and its +4 valance separation line is located closest to the beginning of strip line 56. The reason for the orientation of the "A" and "B" type strips as just noted will be described in detail later.

As can be seen in FIG. 2A, the detector 28 is located immediately below the carrier wheel 24. The detector 28 comprises a conventional Geiger-Muller tube 66 disposed within a cylindrical lead shield 68. The bottom of the shield is sealed by a lead plug 70. The top of the shield includes a lead plate 72 having an elongated slit 74 therein. The slit 74 extends parallel to the axis of the shaft 44. Power for the Geiger-Muller tube is provided, via conductors 76, which extend through an opening 78 in the wall of the shield 68.

As can be seen in FIG. 2A, the apparatus 20 includes three photo source/sensors 80, 82 and 84. The source/sensor 84 provides a signal to the circuitry of the apparatus at the beginning of the traversal of the strip past the detector while the source/sensor 82 provides a signal at the end of the traversal. The source/sensor 80 provides a signal at the separation point on the strip. The operation of the source/sensors 80-84 will be described in detail later. Each source/sensor is permanently mounted within the housing. To that end, the separation source/sensor 80 and the end of strip source/sensor 82 are mounted adjacent each other on one side of the carrier wheel 24, at the bottom thereof opposite to an edge band 87 contiguous with the periphery of the wheel. The beginning of strip photo source/sensor 84 is disposed on the other side 89 of the wheel at an elevation slightly above the shaft 44 and opposite the edge band 87 on that side of the wheel. A pair of non-reflective, e.g., black, markers 86 and 88 are disposed on the edge band 87 of the side 85 of the wheel such that when the wheel 24 is rotated each momentarily is aligned with the photo source/sensors 80 and 82. A similar market 90 is disposed on edge band 87 on the opposite side 89 of the wheel 24 and is arranged to be aligned with the beginning of strip photo source/sensor 84. The marker 90 serves as the beginning of the strip marker and is located on the wheel at a position such that when the beginning of the strip line 56 is disposed over the slit 74 in the detector 28 the marker 90 is aligned with the beginning of strip photo source/sensor 84. In a similar manner the separation market 86 is located on the wheel such that when the wheel is in the position wherein the separation line 64 of either an "A" or "B" type strip is aligned with and over the slit 74 of the detector 28 the separation marker 86 is aligned with the separation photo source/sensor 80. Similarly, the end of strip marker 88 is located on the wheel 24 such that when the end of strip line 58 is located over and aligned with the slit 74 in the detector the end of strip marker 88 is aligned with the end of strip photo source/sensor 82.

The photo source/sensors 80, 82 and 84 and their associated markers operate in conjunction with the electrical circuitry, to be described in detail later, to control the automatic operation of the apparatus 20.

As noted heretofore, when the apparatus is used with an "A" type strip the origin line of the strip is located closest to the beginning of strip line 56 while the separation line is located closest to the end of strip line and when using the apparatus for the "B" type strip the strip is disposed with its origin line closest to the end of strip line and with its separation line located closest to the beginning of strip line. The reason for this arrangement is that in typical "A" and "B" type strips the "A" strip is constructed such that its separation line is located the same distance from the end of the strip furtherest from origin as is the "B" strip separation line from the end of the strip closest to the origin. Accordingly, when the "A" strip is disposed on the carrier wheel as described heretofore and its separation line is aligned with the slit 74 in the detector the separation marker 86 is aligned with the separation source/sensor 80 and when the "B" type strip is disposed on the carrier wheel as described heretofore, its separation line is in the same position.

The only difference in the scanning of the "A" and "B" type strips by the device 20 is that with the "A" type strip the strip is scanned from origin to the end beyond the separation line while the "B" type strip is scanned from the end of the strip beyond the separation line to the origin.

In FIGS. 3A and 3B there is shown the electrical circuitry 200 of the apparatus 20. As can be seen therein, the circuitry 200 comprises power supply circuitry 202. The power supply circuitry 202 will be described later and serves as the means for providing all of the AC and DC power used by the circuitry of the system. The circuitry 200 includes the scan push button 42 connected, via line 206, to one input of the logic circuitry 208. A high voltage supply 210 is connected, via conductors 76, to the emission detector 28. The output of the detector is connected, via line 214, to one input of a pulse height discriminator circuit 216. The output of the discriminator circuit 216 is provided, via line 218, to one input of a linear rate meter circuit 220 and to a pair of two input NAND gates 248 and 252.

The linear rate meter has several outputs, one of which is connected, via line 222, to another input of the logic circuitry 208. Other outputs of the linear rate meter are connected, via lines 224 and 243, to respective inputs of an auto range circuit 226. One output of the auto range circuit is connected, via line 228, as an input to the linear rate meter circuit 220. Another output of the auto range circuit is connected, via line 230, as an input to the logic circuitry 208. The logic circuit 208 also has two outputs which are connected, via lines 235 and 254, as respective inputs to the auto range circuit 226. The output line 254 from the logic circuit is also connected as an input to the linear rate meter 220. Another output of the auto range circuit is connected, via line 234, to a time constant select circuit 236. The auto range circuit has one output line 232 connected as an input to the logic circuit 208 and an output of the time constant select circuit is connected, via line 238, to the linear rate meter circuit 220. Another output of the linear rate meter circuit 220 is connected, via line 242, to one input of the strip chart recorder 34.

A pair of outputs of the logic circuit 208 are connected, via lines 240 and 244, to respective inputs of the pulse height discriminator. Another output of the logic circuit is connected, via line 246, to the other input of the NAND gate 248. Still another output of the logic circuitry 208 is connected, via line 250, to the other input of the NAND gate 252. The output of NAND gate 252 is connected, via line 256, to one input of the total strip register six decade/display circuitry 30 while the output of NAND gate 248 is connected, via line 260, to the separation register five decade/display circuit 32. Another input to the total strip register six decade/display circuit 30 and to the separation register five decade/display 32 is connected to line 206 from the scan push button 42.

Still other outputs of the logic circuitry 208 are connected, via lines 264 and 268 to respective inputs of the speed control circuit 266. Power for the speed control is provided, via line 270, which is connected as an input to the speed control from the power circuits 202. The output of the speed control circuit 266 is connected, via line 272, to a drive motor 54. The motor effects the rotation of the sample holder carrier 24.

The photo source/sensor circuitry 276 is made up of the three source/sensors 80, 82 and 84 which have their outputs connected, via lines 281, 279 and 278, respectively, as inputs to the logic circuit 208. The logic circuit 208 is connected, via line 280, to one input of a solid state relay 282. The solid state relay also has an input for receipt of conventional AC power. The output of the relay 282 is connected, via line 284, to the strip chart recorder 34.

The power supply circuitry 202 comprises a main supply 286 connected to and powering a +12 volt regulated power supply 288, a −6 volt regulated supply 290, a +18 volt regulated supply 292, a −18 volt regulated supply 294, a +5 volt regulated supply 296 and a +24 volt unregulated supply 298. The individual supplies 288-298 provide all the power requirements for the circuitry and components of the apparatus 20. The general operation of the circuitry 200 shown in FIGS. 3A and 3B is as follows: a prepared test strip is loaded onto the sample carrier 24 of the apparatus 20. The scan button 42 is depressed momentarily which activates the logic circuitry, via line 206. The apparatus operates in two distinct cycles. During the first cycle, referred to as the search mode, the strip is scanned to determine if it is suitable for study during the second cycle, referred to as the scan mode. To that end, in the search mode the logic circuitry causes the speed control 266 to rotate the drive motor 274 at a high speed to carry the mounted strip past the detector 28. As the strip passes the detector the detector senses the emissions and provides on line 214 negative pulses proportional to the number of emissions sensed. The pulses are provided to the pulse height discriminator 216 which discriminates between true emission-indicative signals and random noise. Pulses indicative of actual emissions are provided, via line 218, to the linear rate meter circuit 220. The linear rate meter is operative to convert the signals from the pulse height discriminator, which are in real time, to an analog signal proportional to the count rate, calibrated in counts per minute, which the strip chart recorder requires as its input.

The linear rate meter circuit 220, the auto range circuit 226, the time constant circuit 236 and the logic circuit 208 operate in conjunction with one another to determine if various conditions are met in the search cycle, so that a scan cycle can commence. The conditions which must exist before the apparatus can begin the scan cycle is that the peak count rate of the strip must be greater than 3,000 counts per minute to provide statistically valid information, yet be below 300,000 counts per minute so as not to overload the system. The linear rate meter circuit 220 also includes circuitry which during the search cycle monitors the analog voltage proportional to the count rate. Depending upon the magnitude of the voltage the circuit initiates scale changes within the auto range circuit 226. In this connection, the maximum analog signal provided by the linear rate meter to the strip chart recorder is 100 millivolts. In order to avoid overloading the recorder, the linear rate meter establishes five different ranges of count rates such that the maximum count in each range produces the 100 millivolt signal. This action enables wide variations in the total count rate to be accommodated without overloading the strip chart recorder's input. For example, in range 1 the linear ratemeter produces a 0 to 100 millivolt signal whenever the count is between 0 and 3,000 counts per minute, when the count exceeds 3,000 counts per minute the rate meter switches to range 2. When the count exceeds 10,000 counts per minute the rate meter switches to range 3. When the count exceeds 30,000 counts per minute the rate meter switches to range 4 and when the count exceeds 100,000 counts per minute the rate meter switches to range 5.

The time constant select circuit is operative in either range 1 or 2 to increase the time constant of circuitry within the linear rate meter circuit to compensate for statistical fluctuations due to the lower count rates.

After the selection of the proper range (auto ranging) during the search cycle the logic circuitry 208 is enabled to accept strip data during the scan cycle when the sample holder makes a subsequent pass by the detector.

The photo source/sensor 84 detects the position of the a sample carrier with respect to the detector and provides a signal indicative thereof on line 278. This signal is used by the logic circuit 208 to cause the speed control circuit 266 to slow down the rotation of drive motor 274 after the search cycle so that the scan cycle can commence. At the start of the scan cycle the logic circuitry energizes the strip chart recorder, via the solid state relay 282, to provide a graphical representation of the distribution of radioactivity along the strip. At the same time the logic circuitry enables NAND gates 252 and 248 to pass the signals from the pulse height discriminator to the total strip register six decade/display circuit 30. When the separation marker 86 is sensed the logic circuitry enables the separation register five decade/display 32. The total strip register six decade/display is operative to provide a numerical display of the total number of counts detected during the scan pass while the separation register five decade/display provides a numerical display of the separation counts. The chart recorder 34 provides a hard copy printout, in analog fashion, of the distribution of the emissions of the radioactive sample.

In FIG. 4 there is shown the detector 28 and the high voltage supply 210. The detector includes a conventional Geiger-Muller tube 66 disposed within a lead shield as described heretofore. The Geiger-Muller tube is of conventional construction and includes an anode and cathode sealed within a stainless steel housing filled with a halogen gas, such as made by Amperex, catalog number 18504. As can be seen, the cathode 302 of the tube is connected to ground while the anode 304 is connected to line 76 which, as noted heretofore, is the output of the high voltage supply 210. The high voltage supply 210 is arranged to provide a high voltage, e.g., 450 volts DC, on line 312. To that end, the high voltage supply 210 comprises an iron core transformer 306 having a secondary winding 308, one side of which is connected to the anode of a diode 310 and the other side of which is connected to ground. The cathode of diode 310 is connected to the common juncture of a resistor 312 and one side of capacitor 314. The other side of capacitor 314 is connected to ground. The transformer 306 also comprises a primary winding 316 and a tickler winding 318. One side of the primary 316 is connected to one side of a capacitor 320 and to the common juncture of a resistor 322 and a resistor 324. The other side of capacitor 320 is connected to ground. The other side of the primary 316 is connected to the collector 326 of a transistor 328. The emitter 330 of the transistor 328 is connected to ground, while the base is connected to one side of capacitor 332 and to one side of the tickler winding 318. The other side of capacitor 332 is connected to ground. The other side of the tickler winding 318 is connected to one side of a resistor 334, the other side of which is connected to the wiper arm 336 of a potentiometer 338. One side of potentiometer 338 is connected to ground and the other side is connected to the other side of resistor 324. The other side of resistor 322 is connected to a +5 volt bus connected to the +5 volt regulated supply 296 by means (not shown).

As will be appreciated, the transformer 306 and the components associated therewith form an oscillator. The capacitor 320 prevents oscillations produced during the operation of circuit 210 from being fed back to the +5 volt regulated supply 296, via resistor 322. The resistor 324 prevents overvoltage in the event that the setting of the high voltage adjustment potentiometer 338 is at a maximum value.

Operation of the oscillator is as follows: when the power is initially turned on the capacitor 332 provides a momentary delay preventing transistor 328 from conducting. Once the voltage on the capacitor reaches a predetermined level the transistor begins conducting, whereupon a high voltage is produced across the secondary winding 308. The diode 310 rectifies the voltage and capacitor 314 filters it to provide a 450 volt potential across resistor 312 and onto line 212. During the conduction of transistor 328 a feedback signal is provided via the tickler winding 318. This action causes the transistor to shut off momentarily allowing the field to collapse and initiating a new cycle. The setting of potentiometer 338 establishes the maximum voltage applied to the primary and hence the maximum voltage produced on the secondary 308.

Since the 450 volt potential is provided to the anode of the Geiger-Muller tube 66 each time it conducts (as a result of ionizations upon receipt of gamma emissions) a negative going voltage pulse is provided on line 214 as an input to the pulse height discriminator. The details of the pulse height discriminator are shown in FIG. 5.

As can be seen in FIG. 5, the discriminator 216 contains pulse height discriminating circuitry and gating circuitry. The latter circuitry, as will be described in detail later, provides either count or test pulses, as selected by a switch position. The test pulses are provided from the logic circuit for initial system calibration or for system testing functions.

The discriminator portion of circuit 216 is in the form of a preset voltage comparator which compares the pulses appearing on line 214 to a preset threshhold voltage level. The voltage level is established to ensure that noise or other spurious signals do not produce output signals.

The discriminator 216 comprises an operational amplifier 340. In a preferred embodiment of the instant invention the operational amplifier is a model SN72710-M made by Texas Instruments. Pin 4 of operational amplifier 340 is the inverting input and is connected to one side of resistor 344, the anode of a diode 346, the cathode of a diode 348 and one side of a resistor 350. The other side of resistor 344, the cathode of diode 346 and the anode of diode 348 are connected together to ground. The other side of resistor 350 is connected to one side of capacitor 352, the other side of which is connected to line 214, the output line from the detector 28. Pin 3 of the operational amplifier is its non-inverting input terminal and is connected to one side of a resistor 356, the other side of which is connected to the pin 9 of the operational amplifier. This pin is the output and is connected to line 358. Pin 11 of the amplifier 340 is connected to a +12 volt regulated bus (not shown) from supply 288 while pin 6 is connected to the −6 volt regulated bus (not shown) from supply 290 and pin 2 is connected to ground. The non-inverting input 354 of the operational amplifier is also connected to one side of a resistor 359. The other side of resistor 359 is connected to one side of a capacitor 360 and to the wiper arm 362 of a potentiometer 364. One side of the potentiometer 364 is connected to the other side of the capacitor 360 and to ground while the other side of resistor 364 is connected to the cathode of a diode 366. The anode of diode 366 is connected to ground. The cathode of diode 366 is also connected to one side of a resistor 368, the other side of which is connected to the −18 volt bus.

The output of the operational amplifier 340, as provided by line 358, is connected to input pin 10 of a three input NAND gate 370. The other two input pins, 9 and 11, of the NAND gate are connected together to a line 372 which terminates in a contact 374 of a switch 376. Line 372 is also connected to one side of a resistor 378. The other side of resistor 378 is connected to one side of a resistor 380 and to the +5 volt bus (not shown) connected to supply 296. The other side of resistor 380 is connected to line 282 which terminates a fixed contact 384 of the switch 376. Switch 376 is a single pole, double throw switch having a movable contactor 386 connected to ground. Line 382 is connected to a pair of input pins 1 and 2 of a three input NAND gate 388. The other input of the NAND gate 388 is provided at pin 13, via line 240, from the logic circuit 208. The output of NAND gate 370 is provided at pin 8 and is connected to pin 4 of a three input NAND gate 390. The output of NAND gate 388 is provided at pin 12 to input pin 3 of NAND gate 390. The other input to NAND gate 390 is at pin 5 which is connected to line 244 from the logic circuitry 208. The output of NAND gate 390 is provided at pin 6 which is connected to line 218.

In accordance with a preferred aspect of the invention the NAND gates 370, 388 and 390 are formed as a composite integrated circuit such as a SN7410-N made by Texas Instruments.

Operation of the discriminator circuit 216 is as follows: the negative going pulses produced by the detector 28 and appearing on its output line 214 are provided by capacitor 352 and resistor 350 to the inverting input terminal of the operational amplifier 340. The setting of wiper arm 362 of potentiometer 364 establishes the sensitivity of the circuitry, that is establishes the minimum threshhold level at which the operational amplifier will trigger. The threshhold setting precludes the operational amplifier from triggering in response to noise or other spurious signals. The diode 366 establishes a predetermined voltage reference for the potentiometer 364 while the capacitor 360 serves as a filter. The resistor 359 provides an impedance matching function, while the diodes 346 and 348 provide a clamp to prevent overload of the operational amplifier. The resistor 350 limits the current to a safe level for the diodes and in addition in conjunction with the resistor 344 provides a two to one voltage divider for matching the impedance between the inverting and non-inverting input pins of the operational amplifier. The capacitor 352 provides isolation for the discriminator circuit from the 450 volt supply of the detector. The resistor 356 serves as a feedback resistor and also sets up hystersis for the circuit to provide a minimum dead time after each pulse.

As will be appreciated, the signals appearing on output pin 9 of the operational amplifier 340 are positive going signals which are indicative of the actual emissions detected by the detector 28. The signals are provided to input pin 10 of the NAND gate 370. When the switch 376 is in the position shown in FIG. 5, as is the case during normal operation of the apparatus 20, the NAND gate 370 is enabled by the +5 volt appearing on its pins 9 and 11, whereupon the signals indicative of actual emissions and as appearing on line 358 are inverted and passed to input pin 4 of the NAND gate 390. At the same time the ground potential appearing on pins 1 and 2 of NAND gate 388, via line 382 and switch 376, disables the NAND gate 388, whereupon a +5 volt signal appears at its output pin 12 and hence at input pin 3 of NAND gate 390. This enables NAND gate 390. When the scan button 204 is depressed an enable signal is provided by the logic circuitry on line 244. The enable signal is a +5 volt signal. This signal completes the enablement of NAND gate 390, whereupon the NAND gate inverts the signals provided by the NAND gate 370 to provide positive going signals, indicative of actual emissions detected, onto line 218, the output line of the pulse height discriminator.

In the test mode of operation, that is when the device 20 is being checked out or calibrated, the switch 376 is moved to the position wherein its movable contact 386 is in contact with stationary contact 374. This action effects the grounding of pins 9 and 11 of NAND gate 370, thereby disabling the NAND gate from passing signals from the operational amplifier 340. At the same time the +5 volt signal is provided to pins 1 and 2 of NAND gate 388, thereby enabling the NAND GATE. Clock pulses, to be described in detail later, are provided on line 240 from the logic circuit 208. The clock pulses thus appearing at pin 13 of enabled NAND gate 388 are inverted in the NAND gate and provided to pin 3 of NAND gate 390. If the scan push button had been depressed, thereby creating an enable condition, the +5 volt signal appears on line 244, as described heretofore, thereby enabling NAND gate 390 to invert the signals appearing on its pin 3 to provide clock pulses at output line 218 for operation by the remaining circuitry of the system.

The count pulses from the discriminator are at a +5 volt logic level and are indicative of the number of emissions detected (i.e., the count rate). These signals are provided to a flip flop in the linear rate meter 220 which operates on a 50% duty cycle to produce square waves proportional to the count rate. The square waves are amplified to a +18 volt level conversion circuitry in the rate meter. The amplified square waves are then differentiated by selectively operable capacitors in the linear rate meter and are provided to a linear pump circuit, which produces a dc level proportional to the count rate. The dc level is provided as an input to a high gain operational amplifier to produce a large dc signal proportional to the count rate. This signal is divided by a voltage divider to provide a 0 to 100 millivolt signal to the strip chart recorder 34.

The strip chart recorder of the instant invention, as noted heretofore, provides a graphical representation of the count rate in response to the receipt of a 0 to 100 millivolt input signal from the linear rate meter circuit.

As mentioned heretofore, the linear rate meter and auto range circuit include means for establishing five count ranges, with the circuits automatically switching from range to range as the count rate increases. To that end, each time that the count rate exceeds the limits of a range, a range change occurs, whereupon the capacitance in the linear rate meter circuit is decreased. This action ensures that the differentiated signal provided to the linear pump at any given point in an operating range is the same as at the corresponding point in the previous range. The change in range is accomplished in the auto range circuitry by the use of five relays, one for each range. Each relay is selectably operable to connect its associated capacitor as an input to the linear pump when operating in its range, while the other relays are open.

The linear rate meter also includes respective means coupled to the relays to vary the amplitude of the square waves for each range. This feature enables one to calibrate the system for each range.

During operation in either the first or second ranges the time constant select circuit increases the time constant of the operational amplifier in the linear rate meter to obviate irregularities in the signal due to the statistical fluctuations (which fluctuations are inherent in the low repetition rate of the signals of ranges 1 and 2).

The auto range circuit, as will be described in detail later, includes comparator means for monitoring the voltage provided to the strip chart recorder. When the voltage provided to the recorder reaches a predetermined level (e.g., 100 millivolts) the relay associated with the next higher range is activated.

The details of the linear rate meter, auto range and time constant select circuits 220, 226 and 236, respectively, can best be appreciated by reference to FIGS. 6A and 6B. As can be seen therein, the linear rate meter comprises a flip flop 392 whose input pin 1 is connected to line 218 from the pulse height discriminator 216. The flip flop is of conventional construction and comprises one portion of a composite integrated circuit such as a SN7473N made by made by Texas Instruments. Pins 3 and 14 of the flip flop 392 are connected to the +5 volt bus while its reset pin 2 is connected to line 254 from the logic circuit 208. The set output of the flip flop is provided at pin 12 and is connected to one side of a resistor 394. The other side of resistor 394 is connected to the base of a transistor 396. The emitter of transistor 396 is connected to ground while its collector is connected to the common junction of the base of transistor 398 and one side of a resistor 400. The other side of resistor 400 and the collector of transistor 398 are connected together to the +18 volt bus (not shown) connected to supply 292. The emitter of transistor 398 is connected to the juncture of corresponding sides of potentiometers 402, 404, 406, 408 and 410. The other side of potentiometers 402–410 are connected together to ground. The wiper of potentiometer 402 is connected to one side of a capacitor 412, the wiper of potentiometer 404 is connected to one side of capacitor 414, the wiper of potentiometer 406 is connected to one side of a capacitor 416, the wiper of potentiometer 408 is connected to one side of a capacitor 418 and the wiper of potentiometer 410 is connected to one side of a capacitor 420. The other side of capacitor 412 is connected to line 422, the other side of capacitor 414 is connected to line 424, the other side of capacitor 416 is connected to line 426, the other side of capacitor 418 is connected to line 428, the other side of capacitor 420 is connected to line 430. The lines 422–430 represent the schematically drawn line 224 in the block diagram of FIG. 3B.

The linear rate meter 220 also includes a linear pump 432 comprising diodes 434 and 436. The anode of diode 434 is connected to ground while its cathode is connected to the anode of diode 436 and to line 228 from the auto range circuit 226. The cathode of diode 436 is connected to one side of a resistor 438, the other side of which is connected to inverting input pin 4 of an operational amplifier 440. The operational amplifier 440 is of conventional construction such as an SN72709N made by Texas Instruments. Pin 4 of the operational amplifier 440 is also connected to line 238 from the time constant select circuit 236 and to the common juncture of one side of a capacitor 442 and one side of a resistor 444. The other side of capacitor 442 and the other side of resistor 444 are connected together to the output pin 10 of the operational amplifier. A capacitor 446 is connected between pins 9 and 10, while a series circuit of a capacitor 448 and a resistor 450 is connected between pins 12 and 3. Pin 6 of the operational amplifier is connected to a −18 volt bus (not shown) connected to supply 294. Pin 5 of the operational amplifier 440 is its non-inverting input terminal and is connected to the wiper arm 452 of a potentiometer 454. One side of potentiometer 454 is connected to the common juncture of the anode of a diode 456 and one side of a resistor 458. The other side of potentiometer 454 is connected to the common juncture of the cathode of a diode 460 and one side of a resistor 462. The other side of resistor 458 is connected to the +18 volt bus while the other side of resistor 462 is connected to the −18 volt bus. The cathode of diode 456 is connected to ground, as is the anode of diode 460. Pin 10 of the operational amplifier 440 is the output terminal and is connected to one side of a resistor 464 forming part of a voltage divider with a resistor 466. The other side of resistor 464 is connected to line 242 feeding the strip chart recorder and to one side of the resistor 466. The other side of the resistor 466 is connected to ground. The output pin 10 of the operational amplifier is also connected to line 239 to the time constant select circuit 236 and to line 243 to the auto range circuit 226.

As noted heretofore, the auto range circuit 226 comprises five relays, namely, 468, 470, 472, 274 and 476. Each of the relays is a conventional solid state device such as a W171-DIP-7 made by Magnecraft. As can be seen, each relay includes one terminal at pin 7, another terminal at pin 1, an enable terminal at pin 6 and a bias terminal at pin 2.

The relays are connected as follows: pin 2 of each of the relays 468-476 is connected to the +5 volt bus. The input pin 7 of relay 468 is connected to line 422, the input pin 7 of relay 470 is connected to input line 424, the input pin 7 of relay 472 is connected to line 426, the input pin 7 of relay 474 is connected to line 428 and the input pin 7 of relay 476 is connected to line 430. All of the output pins 1, are connected together to line 228, one input to the linear rate meter 220. The enable pin 6 of relay 468 is connected to line 232 from the logic circuitry 208 and to the "1" digit output terminal of a BCD (binary coded decimal) decoder 478. The decoder 478 is a conventional device such such as SN7442N made by Texas Instruments and includes six output terminals. The first output is provided at pin 1 and indicates the digit "1", the second output is provided at pin 2 and indicates the digit "2". The third output is provided at pin 3 and indicates the digit "3". The fourth output is provided at pin 4 and indicates the digit "4". The fifth output is provided at pin 5 and indicates the digit "5". The sixth output is provided at pin 6 and indicates the digit "6". The decoder has four inputs, provided at respective pins 12, 13, 14 and 15. These pins are connected to output pins 11, 8, 9 and 12, respectively, of a binary coded decimal counter 480. The counter 480 is of conventional construction such as a SN7490N made by Texas Instruments. The counter also includes a count input pin 14 connected to line 241 and a reset pin 2 connected to line 235 from the logic circuit. Pin 12 and pin 1 of the counter 480 are connected together so that the counter recycles after one complete cycle of operation. The output pin 2 of the decoder 478 is connected to line 234 from the time constant select circuit and to enable pin 6 of the relay 470 in the auto range circuit. The output pin 3 of the decoder 478 is connected to enable pin 6 of the relay 472. The output pin 4 is connected to the enable pin 6 of the relay 474 and the output pin 5 is connected to enable pin 6 of the relay 476. The output pin 6 is connected to line 230 to the logic circuit 208.

As can be seen in FIG. 6B, the auto range circuit also comprises a resistor 482, one side of which is connected to line 243 from the linear rate meter and line 239 to the time constant select circuit 236. The other side of the resistor 482 is connected to the common juncture of one side of a resistor 484, the anode of a diode 486, the cathode of a diode 488, the inverting input terminal pin 4 of an operational amplifier 490 and one side of a resistor 492. The operational amplifier 490 is a conventional device such as a SN72702N made by Texas Instruments. The cathode of diode 486 and the anode of diode 488 are connected together to one side of a resistor 494 and to ground. The other side of resistor 494 is connected to pin 5, the non-inverting input pin of operational amplifier 490. The output of the operational amplifier is provided at pin 11 and is connected to one side of a resistor 496. The other side of resistor 496 is connected to the common juncture of the other side of resistor 492 and the base of a transistor 498. The other side of resistor 484 is connected to the wiper arm 499 of a potentiometer 500. One side of potentiometer 500 is connected to ground and the other side is connected to one side of a resistor 502. The other side of resistor 502 is connected to the +18 volt bus.

The operational amplifier 490 has its pin 2 connected to ground, its pin 6 connected to the −6 volt bus and its pin 13 connected to the +12 volt bus (not shown) connected to supply 288. The emitter of transistor 498 is connected to ground while its collector is connected to one side of a resistor 504. The other side of resistor 504 is connected to the +5 volt bus and to pin 7 of a flip flop 506, referred to hereinafter as the overflow flip flop. The overflow flip flop 506 is a conventional J-K flip flop and forms a portion of the composite integrated circuit forming flip flop 392. As can be seen, its J input pin 7 is connected to the common juncture of the +5 volt bus and resistor 504. The clock input of the flip flop is provided at pin 5 and is connected to the collector of transistor 498. The K input of the flip flop 506 is provided at pin 10, which is connected to ground. The reset input of the overflow flip flop is provided at pin 6 and is connected to line 254 from the logic circuit 208. The set output of the overflow flip flop is provided at pin 9 and is connected to line 241 which serves as one input to the logic circuit 208.

The details of the time constant select circuit 236 are shown in FIG. 6B. This circuit comprises a solid state relay 508 of the same type as relays 468–476. The enable pin 6 of relay 509 is connected to the anode of a pair of diodes 508 and 510. The cathode of diode 508 is connected to line 234 to the auto range circuit and the cathode of diode 510 is connected to line 232 to the auto range circuit and the logic circuit. The pin 7 of relay 509 is connected to line 238 to the linear rate meter, while pin 1 is connected to one side of a capacitor 512. The other side of the capacitor is connected to the line 239 which is connected as an input to the auto range circuit.

Operation of the circuitry of the linear rate meter, the auto range circuit and the time constant select circuit is as follows: the negative pulses from the discriminator are applied, via line 218, to the clock input pin 1 of the flip flop 392 to cause it to periodically change states to provide 50% duty cycle square waves at its output pin 12. The flip flop is reset, via line 254, from the logic circuitry 208. The details of the logic circuitry will be described in detail later. Suffice for now to say that the logic circuitry includes a monostable multivibrator which times out for 100 milliseconds after the occurrence of an overflow condition (indicating a range change) resetting flip flop 392. The 100 millisecond delay enables the circuitry of the system to settle down before continuing operation.

The 50% duty cycle square waves from the flip flop 392 are at a +5 volt logic level and are amplified by the transistors 396 and 398 and provided to the potentiometers 402–410. The potentiometers establish the amplitude of the square waves enabled to pass therethrough. Since the potentiometers are in series with the respective relays 468–476, whenever any relay is energized by the provision of an enable signal at its enable pin 6 it conducts between pins 7 and 1 so that the square wave is enabled to pass through the associated potentiometer, to the serially connected capacitor. Only one relay is enabled at any given time in the operation of the system, with the relay being enabled being associated with the count range being operated in. In this regard, when the system is operating in range 1 pin 6 of relay 468 is enabled, when operating in range 2 pin 6 of relay 470 is enabled, when operating in range 3 pin 6 of relay 472 is enabled, when operating in range 4 pin 6 of relay 474 is enabled and when operating in range 5 pin 6 of relay 476 is enabled. The relays are enabled sequentially by the signals provided at pins 1–5 of the BCD decoder 478. The decoder receives inputs from the range counter 480 which advances one BCD digit every time it is clocked. The range counter is clocked each time that the overflow flip flop 506 sets, which action occurs when the auto range circuit determines that the count rate has exceeded the limits of a range. To that end, each time flip flop 506 sets, as will be described in detail later, the negative going edge of the signal appearing in its pin 9 is coupled, via line 241, to the clock input pin 14 of the counter 480.

The BCD decoder 480 is arranged such that when the counter 480 is cleared, i.e., it has a ground signal at each of its output pins, the output pin 1 of the BCD decoder 478 is a ground potential while pins 2–6 have a +5 volt signal thereon. The ground potential signal on pin 1 of the BCD decoder is carried to pin 6 of relay 468 to enable the relay to conduct. This action enables the differentiation of the square wave provided through potentiometer 412 to occur and provides the differentiated signal, via line 228, to the input of the linear pump 432. The differentiation of the square wave is accomplished by the capacitance of the capacitor 412 in combination with the input impedance of the linear pump and operational amplifier. The differentiated signal, as will be appreciated by those skilled in the art, consists of positive and negative going pulses. The pulses are operated upon by the linear pump, whereupon the negative pulses are clipped by diode 434 and the positive pulses are passed as an input to the inverting input pin 4 of operational amplifier 440.

The non-inverting input pin 5 of the operational amplifier 440 is connected to a reference supply comprising the potentiometer 454, the resistors 458 and 462 and the diodes 456 and 460. The setting of the wiper arm 452 of the potentiometer 454 establishes the reference to the operational amplifier such that when input pin 4 is at 0 volts the output of the operational amplifier is also at 0 volts. The capacitor 442 serves as the feedback capacitor, which in conjunction with resistor 444 establishes the time constant for the amplifier. The capacitor 442 also acts to filter out any irregularities in the output signal. The capacitor 446 establishes the frequency response to the operational amplifier while the capacitor 448 and the serially connected resistor 450 establish the lead-lag time.

As will be appreciated by those skilled in the art, the operational amplifier connected as shown, has a very large gain, e.g., 1,000, such that a large dc signal proportional to the count rate is produced at its output pin 10. The output signal is from 0 to 10 volts, depending upon the input signal. A voltage divider comprising reactors 464 and 466 divides the output voltabe by a factor of 10:1. Accordingly, a signal from 0 to 100 millivolts is provided on line 242, as the data input to the strip chart recorder.

The output signal appearing on pin 10 of operational amplifier 440 is also provided, via line 243 and resistor 482, to the inverting input pin 4 of operational amplifier 490 in the auto range circuit. As should be appreciated by those skilled in the art, operational amplifier 490 is connected as a comparator with the potentiometer 500 establishing the level at which the amplifier conducts. To that end, voltage appearing on line 243 and across resistor 482 is summed with the voltage established by potentiometer 500 and resistor 484. When the sum of the voltages appearing at the inverting input pin 4 is zero the operational amplifier 490 produces a positive pulse at its output and to the base of transistor 498. This action renders the transistor conductive to provide a ground potential signal to the clock input pin 5 of the overflow flip flop 506. The clock signal at pin 5 sets the flip flop.

Since the set output pin 9 of overflow flip flop 506 is connected to line 241 which is also connected to the clock input pin 14 of the range counter 480, the setting of flip flop 506 causes the counter 480 to advance one BCD digit. The position of the count in the counter 480 is sensed by the BCD decoder 478 which provides a ground potential signal on its output pin which corresponds to the count position in the counter 480. The ground potential signal appearing at an output of the BCD decoder 478 is coupled to pin 6 of its associated relay, whereupon the associated relay closes. This action establishes a new count range.

During operation in either range 1 or 2 an additional one-half second is added to the time constant of the operational amplifier 440 to produce a smoother analog output voltage to the strip chart recorder by averaging out statistical fluctuations of the data. This is accomplished by the relay 508 being rendered conductive during operation in either the first or second range as indicated by the output of the BCD decoder 478. The conduction of the relay 508 places capacitor 512 in parallel with the feedback capacitor 442 across the inverting input and output pins of operational amplifier 440. Accordingly, the total time constant of the operational amplifier 440 is increased by one-half second. Once the count range exceeds that of range 2 the one-half second time constant produced by the feedback capacitor 442 and the resistor 444 is sufficient to provide a suitably smooth analog signal on line 242 to the strip chart recorder.

Operation of the linear rate meter, auto range circuit and time constant select circuit when the system begins its search mode of operation is as follows: the flip flop 392 and the flip flop 506 will have been reset from the logic circuitry, via lines 254 and 237, respectively, as will be described in detail later. In addition, the counter 480 will have been cleared by the logic circuitry such that the BCD decoder 478 has a ground potential signal on its pin 1 and a +5 volt signal appearing on each of its pins 2-6. The ground signal appearing on pin 1 is coupled to pin 6 of the relay 468, thereby rendering the relay conductive.

The signals received from the discriminator are processed by the flip flop 392 to provide the square waves of 50% duty cycle, which are amplified by transistors 396 and 398 and provided through potentiometer 402 and its serially connected capacitor 402 to its serially connected capacitor 412. The capacitor 412 in conjunction with the input impedance to the linear pump 432 and operational amplifier 440 differentiates the square waves. The linear pump provides the clamped rectified signal to the inverting input terminal of the operational amplifier 440. The operational amplifier operates as described heretofore to produce a large excursion -dc signal on line 243. The signal is porportional to the count rate and thus increases as the count rate increases. The comparator monitors the signal on line 243. When the voltage appearing on line 243 reaches the voltage as established by the setting of potentiometer 500, e.g., full scale voltage, the comparator 490 provides an output signal which renders transistor 498 conductive. This action effects the setting of overflow flip flop 506. The setting of flip flop 506 causes the BCD counter 480 to advance one BCD digit. The advancement of the count in the counter is sensed by the BCD decoder 478, whereupon the signal appearing on its output pin 1 goes to +5 volts, while the signal appearing on its pin 2 goes to ground potential. Accordingly, relay 470 conducts and relay 468 ceases conducting, whereupon potentiometer 404 and capacitor 414 are inserted into the signal path in lieu of the potentiometer 402 and capacitor 412.

Each time there is a range change, as described above, the logic circuitry 208 provides a signal, via lines 254, to reset flip flops 506 and 392.

During operation in either range 1 or range 2 the additional one-half second time constant is added to the time constant circuit of the linear rate meter by the conduction of the relay 509. To that end, during range 1 operation, the ground potential signal appearing on pin 1 of the BCD decoder 478 renders diode 508 conductive, thereby applying the ground potential signal to pin 6 of relay 509. This action causes relay 509 to conduct, whereupon capacitor 512 is connected across feedback capacitor 412. In a similar manner the ground potential signal appearing on pin 2 of the BCD decoder 478 during range 2 operation renders diode 508 conductive, thereby applying ground potential to pin 6 of the relay 509 to render it conductive and place capacitor 512 across capacitor 442.

If in range 2 operation the output of the operational amplifier 440 reaches the predetermined voltage as established by the potentiometer 500 the comparator 490 conducts to render transistor 498 conductive. This action sets overflow flip flop 506 and causes the BCD counter 480 to advance one more BCD digit. The advancement of the BCD digit causes the output pin 3 of the BCD decoder 478 to go to ground potential while pin 2 goes to +5 volts. The ground potential signal appearing on pin 3 is coupled to pin 6 of relay 472. At the same time the +5 volt signal is coupled to pin 6 of relay 470. This action causes relay 472 to conduct and relay 470 to cease conducting, whereupon the potentiometer 406 and the serially connected capacitor 416 are placed in the signal path in lieu of potentiometer 404 and the capacitor 414. The circuit is now in range 3 operation.

Operation of the linear rate meter and auto range circuit continues from range to range until the output of the operational amplifier 440 reaches a maximum level and below the predetermined level at which the operational amplifier 490 conducts. When this occurs the conductive relay of the relays 468-476 remains conductive and the non-conductive relays remain non-conductive, thereby establishing the system settings for operation at the maximum count rate which will be encountered during the subsequent scan mode of operation.

As can be seen in FIG. 6B, line 232 is connected to output pin 1 of the BCD decoder 478. As noted heretofore, pin 1 goes to +5 volts when the count rate sensed exceeds the maximum limit of range 1. The +5 volt signal appearing on line 232 is provided as an input to the logic circuit to indicate to the logic circuit that the first criteria for a statistically valid examination has been met, namely, that the count is in excess of 3,000 counts per minute. The logic circuitry also monitors the auto range circuit to ensure that the second criteria for valid operation is met, namely, that the count has not exceeded 300,000 counts per minute. To that end, the logic circuit 208 also monitors line 230. Since line 230 is connected to pin 6 of the BCD decoder 478 a +5 volt signal appears on line 230 whenever the count monitored is within the first five ranges. Should the count exceed that of the upper limit of range 5, namely, 300,000 counts per minute, then pins 1-5 of the BCD decoder 478 will be at the +5 volt potential while pin 6 is at ground potential. The ground potential signal appearing on pin 6 and connected line 230 is used by the logic circuit to stop the operation of the motor and prevent the initiation of the scan mode of operation.

The details of the logic circuits 208 is shown in FIGS. 7A and 7B. As can be seen in FIG. 7A, the logic circuitry 208 comprises a monostable multivibrator or one shot 514. The monostable multivibrator 514 is a conventional device such as a SN74121-N made by Texas Instruments. The input to the one shot 514 is provided at pin 3 and is connected to the common juncture of one side of a resistor 516 and one side of a capacitor 518. The other side of the resistor 516 and the capacitor 518 are connected together to line 206 from the scan push button 204. The set output of the one shot is provided at pin 6 and is connected to line 235 to the auto range circuit, while the complimentary or reset output is provided at pin 1 and to connected lines 520. A capacitor 522 is connected between pins 10 and 11 of the one shot while its pin 11 is connected to one side of a resistor 524. The other side of the resistor is connected to the +5 volt bus. Pin 5 of the one shot is also connected to the +5 volt bus.

The one shot 514 is arranged to be activated by the depression of the scan push button 42. The push button 42 comprises a movable contact 525 adapted to momentarily contact a stationary contact 527. The contact 527 is connected to line 206 to the logic circuitry and also to the total strip register six decade/display 258 and the separation register five decade/display 262. The movable contact 525 is connected to ground.

As will be appreciated by those skilled in the art, the momentary depression of the movable contact 525 of the switch 204 provides a ground potential signal on line 206. The ground potential signal, as will be described in detail later, resets the displays of the total strip register six decade/display and the separation register five decade/display. In addition, the ground potential signal is provided to input pin 3 of the one shot 514. The capacitor 518 and the resistor 516 prevent the production of spurious signals resulting from contact bounce in the switch 204. The time constant of the one shot 514 is 1 millisecond. Accordingly, upon the depression of the switch 204 a +5 volt signal is produced for 1 millisecond at the set output pin 6 and a complimentary 1 millisecond ground potential signal appears at pin 1 and hence on line 520.

As can be seen in FIG. 7A, the logic circuitry also comprises a flip flop 526, denoted as the "search" flip flop, and a flip flop 528, denoted as the "scan" flip flop. The flip flops 526 and 528 are conventional devices formed as integral composite integrated circuit such as SN7473N made by Texas Instruments. The clock input pin 1 of the search flip flop 526 is connected to line 235 and to the set output pin 6 of the one shot 514. The J input of flip flop 526 is provided at pin 14 and is connected to the +5 volt bus, while the K input is provided at pin 3 and is connected to ground. The set output of flip flop 526 is provided at pin 12 while the reset output is provided at pin 13. The flip flop 526 includes a direct reset input provided at pin 2. Pin 2 of flip flop 526 is connected to the corresponding pin 6 of the scan flip flop 528. The J input of the scan flip flop 528 is provided at pin 7 and is connected to the +5 volt bus, while the K input is provided at pin 10 and is connected to ground. The set output of flip flop 528 is provided at pin 9, while the reset output is provided at pin 8. The clock input for the scan flip flop is provided at pin 5.

The set output pin 12 of search flip flop 526 is connected to line 530 while the reset output pin 13 is connected to line 264 to the motor speed control 266. The set output pin 9 of the scan flip flop is connected to line 268 to the motor speed control and to line 244 to the discriminator 216. The reset output pin 8 of the scan flip flop 528 is connected to line 280 to the solid state relay. The reset pin 6 of the scan flip flop 528 is connected to the anode of a pair of diodes 532 and 534, to one side of a resistor 536 and to the anode of a diode 538. The other side of resistor 536 is connected to the +5 volt bus while the cathode of diode 538 is connected to the common juncture of a capacitor 540 and a resistor 542. The other side of resistor 542 is connected to the +5 volt bus and the other side of capacitor 540 is connected to ground.

When the logic circuitry is powered up, that is upon the energization of the system from the power supply 202 and before the depression of push button 42 a +5 volt signal appears across resistor 542 while capacitor 540 holds the voltage across it to approximately ground potential for a short period of time. The low potential appearing on capacitor 540 momentarily enables diode 538 to conduct, thereby providing a ground signal on pin 6 of the scan flip flop 528. This action resets the flip flop 528, whereupon a ground potential signal appears on its set pin 9 and a +5 volt signal appears on its reset pin 8. At the same time the search flip flop 526 is also reset, via its pin 6. Accordingly, a ground potential signal appears at output pin 12 of the search flip flop 526 and a +5 volt signal appears at its reset output pin 13 and hence onto line 264. Line 264 is an input to the speed control circuit 266. The high signal appearing on line 264, as will be described in detail later, is used by the speed control to inhibit the motor 54.

Referring now to FIG. 7B, it can be seen that the logic circuitry 208 also comprises a two-bit shift register formed by a pair of flip flops 544 and 546. The flip flops are conventional components and are formed as a composite integrated circuit such as a SN7474N made by Texas Instruments. As can be seen, the reset input pins 1 and 13 of flip flops 544 and 546 are connected to line 520 which is connected to the reset output pin 1 of the monostable multivibrator 514. The clock input pin 3 of the flip flop 544 is connected to the corresponding clock input pin 11 of the flip flop 546 and to line 548. The set input pin 2 of the flip flop 544 is connected to the +5 volt bus. The direct set pins 4 and 10 of flip flops 544 and 546, respectively, are connected together to line 230 from pin 6 of the BCD decoder 478 in the auto range circuit. The set output pin 5 of the flip flop 544 is connected to the set input pin 12 of the flip flop 546. The set output pin 9 of flip flop 546 is connected to line 550.

As will be appreciated by those skilled in the art, when the output pin 6 of one shot 514 goes from ground to +5 volts in response to the momentary depression of the scan push button 204 the leading edge of the signal is provided, via line 235, to the range counter 480 to reset the counter to its cleared state, whereupon a ground potential signal appears at all of its output pins. At the same time the leading edge of the +5 volt-to-ground signal produced on the complimentary output pin 1 of the one shot 514 effects the resetting of the two stage shift register composed of flip flops 544 and 546, via line 520.

The set output pin 9 of flip flop 546 is connected via line 550, to input pin 1 of a two input NAND gate 552 and to both input pins 4 and 5 of a two input NAND gate 554. The other input to NAND gate 552 is provided at pin 2 which is connected to line 556. The NAND gates 552 and 554 are conventional devices and are formed as a composite integrated circuit such as a SN7400N made by Texas Instruments.

As can be seen in FIG. 7B, line 556 is connected to the output pin 12 of a divide-by-sixteen circuit 558. The divide-by-sixteen circuit 558 is a conventional device such as a SN7493-N made by Texas Instruments. The input to the divide-by-sixteen circuit is provided at pin 1 which is connected to line 240 and also to the set output pin 1 of another monostable multivibrator or one shot 560. The one shot 560 is connected as a schmidt trigger and is a conventional device such as a SN74121N made by Texas Instruments. A capacitor 562 is connected across pin 10 and pin 11 of the one shot 560 and to one side of a resistor 564. The other side of resistor 564 is connected to the +5 volt bus. The input pin 5 of the one shot 560 is connected to the common juncture of a resistor 566, a resistor 568 and the cathode of a diode 570. The anode of diode 570 is connected to the other side of a resistor 568 and to ground. The other side of resistor 566 is connected to the 60 hertz AC power for the system. The input pins 3 and 4 are connected together to ground.

As will be appreciated by those skilled in the art, resistors 566 and 568 act as a voltage divider for the input signal to the monostable multivibrator 560, while diode 570 acts as a clamp. The capacitor 562 and the resistor 564 establish the width of the pulse produced by the one shot at pin 1. In accordance with a preferred aspect of the invention the pulse is of 0.1 millisecond duration and at a 60 hertz repitition rate. The pulse train is provided, via line 240, to input pin 1 of the divide-by-sixteen circuit 558. This circuit divides the input signals by sixteen and provides the divided signals, which are in the form of a train of clock pulses of 150 millisecond duration at a repetition rate of 4 hertz, to lines 556 and 559. The line 556 is connected to input pin 2 of the NAND gate 552. The line 559 is connected to an input pin 4 of a two input NAND gate 561. The other input to NAND gate 561 is provided by pin 5 and is connected to the set output pin 12 of the search flip flop 526. The NAND gate 561 is of conventional construction and is formed as one component of a composite integrated circuit such as a SN7400N made by Texas Instruments.

When the search flip flop 526 is set, as described heretofore by the depression of the scan push button, the +5 volt signal appearing on its output pin 12 is carried by line 530 to input pin 5 of the NAND gate 561. This action enables NAND gate 561 to pass the divide-by-sixteen clock pulses provided on line 559 from pin 12 of the divide-by-sixteen circuit 558.

As can be seen in FIGS. 7A and 7B, the output pin 6 of NAND gate 561 is connected at input pin 10 of a two input NAND gate 563. The other input of NAND gate 563 is provided at pin 9, which is connected to line 280 from the reset output pin 8 of the scan flip flop 528. Since the scan flip flop 528 is reset immediately after power up, a +5 volt signal appears on its reset output pin 8. The +5 volt signal is carried by line 280 to input pin 9 of the NAND gate 563. The output of NAND gate 563 is provided at pin 8 and is connected to input pins 1 and 2 of a two input NAND gate 565. Accordingly, the +5 volt signal on pin 9 of the NAND gate 563 enables the NAND gate to pass the divide-by-sixteen clock pulses therethrough and to both inputs of the NAND gate 565. NAND gate 565 acts as an inverter to invert the divide-by-sixteen pulses provided thereto from NAND gate 563. The output of NAND gate 565 is provided at pin 3 which is connected to one side of a resistor 567. The NAND gates 563 and 565 are conventional circuits each forming a portion of the composite integrated circuit forming NAND gate 561. The other side of resistor 567 is connected to the base of a transistor 569. The collector of transistor 569 is connected to the base of a transistor 571 and to one side of a resistor 573. The other side of resistor 573 is connected to the +5 volt bus. The emitter of transistors 569 and 571 are connected together to ground. The collector of transistor 571 is connected to line 574. The line 574 serves as an input to a pair of indicator lamps 576 in the scan push button circuitry. The lamps are physically located behind the push button 42 to effect its illumination. The other side of the lamps 576 are connected to a +24 volt bus (not shown) connected to supply 298. As should be appreciated by those skilled in the art, the divide-by-sixteen pulses provided at pin 3 of NAND gate 565 cause the transistor 569 to turn on and off at the repitition rate of the pulses. When transistor 569 conducts transistor 571 is rendered non-conductive and vice versa. Since the lamps 576 are connected in series between the +24 volt bus and ground by the emitter-to-collector junction of transistor 571, each time that transistor 571 is rendered conductive the lamps 576 illuminate. Accordingly, all during the search mode of operation the indicator lamps 576 flash behind the push button 42.

As described heretofore, the chromatagram strip sample carrier 24 has three position markers thereon, namely, the beginning of strip marker 90, the separation marker 86 and the end of strip marker 88. The photo source/sensors denoted by the general reference numeral 276 in the block diagram of FIGS. 3A and 3B includes the beginning of strip source/sensor 84, the separation source/sensor 80 and the end of strip source/sensor 82, described heretofore. The beginning of strip sensor 84 is connected, via line 278, as one input to the logic circuitry 208, the separation source/sensor 80 is connected, via line 281, as another input to the logic circuitry and the end of strip source/sensor 82 is connected, via line 279, as still another input to the logic circuitry. Each sensor is arranged to provide a +5 volt signal to the logic circuitry in response to the detection of the alignment of its associated marker, as described heretofore.

As can be seen in FIG. 7A, the input line 278 from the beginning of strip sensor 84 is connected to input pin 12 of a two input NAND gate 578 and to input pin 13 of a two input NAND gate 580. The NAND gate 578 is a conventional device which is formed as one part of the composite integrated circuit making up NAND gates 561, 563 and 565. The NAND gate 580 is a conventional device which is formed as one part of the composite integrated circuit making up NAND gates 552 and 554. The output of NAND gate 580 is provided at pin 11 which is connected to line 548. The other input of the NAND gate 578 is provided at pin 13 and is connected to line 232 and to line 582. Line 582 is connected to input pins 9 and 10 of a two input NAND gate 584. The NAND gate 584 is of conventional construction and is formed as one part of the composite integrated circuit forming NAND gates 580, 552 and 554. As should be appreciated, NAND gate 584 acts as an inverter. The output of inverter 584 is provided at pin 8 and is connected, via line 586, to input pin 12 of the two input NAND gate 580. The output of NAND gate 580 is provided on line 548 to the clock input pins 3 and 11 of the flip flops 544 and 546 comprising the two-bit shift register.

As can be seen in FIG. 7A, the end of strip source/sensor 82 is connected, via line 279, to input pin 9 of a two input NAND gate 588. The other input of NAND gate 588 is provided at pin 12 which is connected to line 590. The NAND gate 588 is a conventional device which is formed as one part of the composite integrated circuit forming NAND gates 248 and 252. The line 590 is connected to the set output pin 8 of a flip flop 592 and to input line 246 of gate 248. The flip flop 592 is a conventional device such as a SN7472N made by Texas Instruments and includes a direct reset pin 2 connected to line 520 from the reset output pin 1 of the one shot 514. The flip flop 592 also has a direct set pin 13 which is connected to the output pin 3 of a two input NAND gate 595. The NAND gate 595 is a conventional device which is formed as one part of the composite integrated circuit forming NAND gates 248, 252 and 288. The input pin 2 of the NAND gate 595 is connected to line 281 from the separation source/sensor 80. The other input pin 1 of the NAND gate 595 is connected to set output pin 9 of the scan flip flop 528. The set output pin 9 of scan flip flop 528 is also connected to the input line 250 to the NAND gate 252. The line 218 from the pulse height discriminator is connected to the input pin 10 of the NAND gate 252 and the input pin 4 of the NAND gate 248. The other input pin, 9, to NAND gate 252 is connected to line 250 from the output pin 9 of the flip flop 514. The other input pin 5 of NAND gate 248 is connected to line 246 from the set output pin 8 of the flip flop 592.

The output of NAND gate 588 is provided at pin 11 and is connected to the cathode of the diode 534. The output of NAND gate 554 is provided at pin 6 and is connected to the cathode of the diode 532. The set output pin 9 of the scan flip flop 528 is also connected to the input pin 3 of a monostable multivibrator or one shot 594. The one shot 594 is of conventional construction such as a SN74121-N made by Texas Instruments. The other input pin 5 of the one shot 594 is connected to line 241 from the overflow flip flop 506 of the auto range circuit. The output of one shot 594 is provided at pin 1 to line 254. Line 254 is connected to the direct reset input pin 2 of flip flop 392 in the linear rate meter and to the direct reset pin 6 of the overflow flip flop 506 in the auto range circuit. The pin 11 of the one shot 594 is also connected to one side of a resistor 598, the other side of which is connected to the +5 volt bus. A capacitor 596 is connected between pins 10 and 11.

As can be seen in FIG. 7B, the output pin 3 of NAND gate 552 is connected to one side of a resistor 600. The other side of the resistor is connected to the cathode of a light emitting diode 602. The anode of the diode is connected to the +5 volt bus.

The following describes the operation of the logic circuitry 208 assuming that during a search mode a count of at least 3,000 is not detected (as would be the case for a weak sample or if no chromatagram strip is on the carrier): Since line 232 has a ground potential signal on it whenever the system is operating within range 1, i.e., below 3,000 counts per minute, a ground signal appears at pin 12 of NAND gate 578. This action disables the NAND gate 578. When the sample carrier has rotated to the position such that its marker 90 is aligned with the beginning of strip source/sensor 84, the source/sensor produces a +5 volt signal to disabled NAND gate 578 via line 278. The ground signal from line 232 is also carried, via line 582, to the inverter 584. Accordingly, a +5 volt signal is produced by the inverter 584 on line 586 to input pin 12 of NAND gate 580. This signal enables the NAND gate 580. Accordingly, the NAND gate 580 provides a ground signal, via line 548, to the clock input pins 3 and 11 of the flip flops 544 and 546 making up the two-bit shift register. Since flip flop 544 had been reset in response to the depression of the scan push button, as described heretofore, the provision of the clock pulse at its clock input pin 3 causes the flip flop to set and provide a +5 volt signal on its set output pin 5. The +5 volt signal thus appears on the set input pin 12 of the second stage flip flop 546. However, the flip flop 546 does not set until clocked, as will be described hereinafter. After the sample holder has made one complete revolution (completing the search mode) and when the beginning of strip source/sensor 84 senses the beginning of strip marker 90, another +5 volt signal is again produced on line 278 but NAND gate 578 is still disabled (since operation never progressed beyond range 1). The +5 volt signal from the beginning of strip source/sensor is also provided to the NAND gate 580 which results in the clocking of flip flops 544 and 546, as described heretofore. Since flip flop 546 had a +5 volt signal provided to its set input pin 12 during the search cycle the flip flop 546 sets. The setting of flip flop 546 causes a +5 volt signal to appear at its set output pin 9. Since the set output pin 9 is connected, via line 550, to input pin 1 of the NAND gate 552 the gate is enabled. Once enabled the NAND gate 552 permits the divide-by-sixteen clock pulses provided at its pin 2, from line 556, to appear at its output pin 3 and through resistor 600 to illuminate the diode 602 intermittently. This action provides a visual signal that the sample should be checked.

At the same time that the flip flop 546 provides a +5 volt signal to NAND gate 552 it also provides that signal to the inverter 554. The inverter inverts the signal to a ground level signal, thereby rendering diode 532 conductive. This action resets the search flip flop 526, thereby causing a +5 volt signal to appear on its reset pin 13. The +5 volt signal is connected, via line 264, to the search motor speed control to stop the motor 54 from operating.

Since search flip flop 526 is now reset the ground potential signal appearing on its set pin 12 appears on pin 5 of NAND gate 561 to disable it. The disablement of NAND gate 561 precludes any clock pulses from being provided to the indicator lamps 576 and such lamps go out.

During the search mode of operation each time that the auto range circuit changes range, its overflow flip flop 506 sets. The set output pin 9 of the flip flop 506 is connected, via line 241, to the input pin 5 of the one shot 594 in the logic circuitry. Accordingly, when the overflow flip flop sets it activates the one shot 594. The output of the one shot 594 is provided, via pin 1, to line 254 which is connected to the direct reset input pin 2 of the flip flop 392 in the linear rate meter and to the direct reset pin 6 of the overflow flip flop 506 in the auto range circuit. In accordance with a preferred aspect of the invention the time delay of the one shot 594 is 100 milliseconds. Accordingly, each time that a scale change occurs in the auto range circuit the one shot 594 resets the flip flop 392 in the linear rate meter thereby precluding the signals from the discriminator to pass to the linear rate meter for 100 milliseconds and also resets the overflow flip flop 506 to ready it for another operation. At the end of the 100 millisecond delay the output pin 1 of the one shot 594 goes to +5 volts, thereby enabling the flip flop 392 to pass the signals from the discriminator. During the scan mode of operation the one shot 594 is disabled from operating since the scan flip flop 528 is set, thus providing a +5 volt +5 volt signal to disable the input pin 3 of the one shot 594.

The following description of the logic circuitry assumes that there is a strip 26 in the carrier 24 and that during the search operation the system has detected a count of at least 3,000 counts per minute but less than 300,000 counts per minute and that the auto range circuit and linear rate meter have established the proper operating range.

As noted heretofore, once the auto range circuit has entered the second range, e.g., above 3,000 counts per minute, a +5 volt signal appears on the "1" digit output pin of the BCD decoder 478 and hence on line 232. This signal is provided as an input to pin 13 of the NAND gate 578 to enable it. The next time that the beginning of strip marker 90 on the carrier passes the associated beginning of strip sensor 84, as occurs when the system begins the scan cycle, the sensor produces a +5 volt signal which is provided, via line 278, to input pin 12 of the NAND gate 578. Since the NAND gate has been enabled by the +5 volt on pin 13 a ground signal is produced on its output pin 11 and is coupled to the clock input pin 5 of the scan flip flop 528. Since the set input of flip flop 528 is always connected to the +5 volt bus the appearance of the clock signal at its clock input pin 5 causes the flip flop to set, whereupon its set output pin 9 goes to +5 volts and its reset output pin 8 goes to ground potential. The ground signal appearing on reset pin 8 is provided to input pin 9 of the NAND gate 563, thereby disabling the NAND gate and holding its output at +5 volts. The +5 volt signal is inverted by NAND gate 565 to provide a ground potential signal to the base of transistor 569. This action causes the transistor 569 to cease conducting and transistor 571 commences conducting, whereupon lamps 576 illuminate continuously. Accordingly, a visual signal is provided at push button 42 to indicate that the system is in its scan mode of operation.

When the system enters the scan mode, since the set output pin 9 of the scan flip flop 528 is connected, via line 268, to the speed control circuit 266, the +5 volt signal appearing on pin 9 when the scan flip flop 528 sets causes the speed control to slow down the rotation of the drive motor 274 to the scan rate of speed. In addition, set output pin 9 of the scan flip flop 528 is also connected to line 244 which is connected to the enable input pin 5 of the NAND gate 390 in the discriminator circuit 216. As noted heretofore, when line 244 is provided with a +5 volt signal its output NAND gate 390 is enabled whereupon the discriminator provides output pulses indicative of the detected emissions to the linear rate meter 220.

The set output pin 9 of the scan flip flop 528 is also connected, via line 250, to input pin 9 of the NAND gate 252. Accordingly, when the scan flip flop sets the NAND gate 252 is enabled. The other input to NAND gate 252 is provided at pin 10, via line 218, from the discriminator circuit. Accordingly, when the discriminator circuit is enabled to provide clock pulses at its output line 218, the NAND gate 252 is enabled to pass such pulses to its output line 256 and to the total strip register six decade/display circuit 30 connected thereto. Therefore, a numerical display of the count as it proceeds is produced by the display circuit 30. At the same time that the logic circuitry enters the scan mode of operation, i.e., scan flip flop 528 sets, the logic circuitry enables the strip chart recorder 34 to begin operation. To that end, the ground signal appearing on reset pin 8 of the scan flip flop 528 is provided, via line 280, to the solid state relay 282. The solid state relay is arranged, as will be described in detail later, to activate the strip chart recorder when provided with a ground signal at its input line 280. Accordingly, the strip chart commences to provide a graphical display of the distribution of the counts detected in accordance with the signal provided on line 242 from the linear rate meter. The graphical display continues until the completion of the scan cycle.

Operation of the circuitry as described heretofore continues until the sample carrier moves the separation marker 86 opposite the separation source/sensor 80. This action causes the separation source/sensor to provide a +5 volt signal on its output line 281. Since line 281 is connected to input pin 2 of NAND gate 595 the +5 volt signal appearing on line 281 enables the NAND gate 595. The other input to NAND gate 595 is provided at pin 1 from the set output pin 9 of the scan flip flop 528. Since this flip flop has set at the beginning of the scan operation the NAND gate 595 provides a ground potential signal to the direct set input pin 13 of the flip flop 592 to set it. The flip flop 592 is denoted as the separation flip flop. When the separation flip flop 592 sets a +5 volt signal is provided from its output pin 8, via line 246, to input pin 5 of NAND gate 248. This action enables the NAND gate to pass the discriminator pulses provided, via line 218, to its input pin 4. Accordingly, the discriminator pulses pass to line 260 which serves as the input to the separation register five decade/display circuit 32. Therefore, when the separation flip flop 592 sets the separation register five decade/display starts to display the count sensed from the separation line onward.

Operation of the system continues as described above with the chart recorder providing a graphical representation of the distribution of the total count, the total strip register six decade/display circuit 30 providing a numerical display of the total count and the separation register five decade/display 30 providing a numerical display of the count from the separation point onward.

When the end of strip marker 88 is carried by the sample holder past the end of strip sensor 82, the sensor provides a +5 volt signal on its output line 279. The +5 volt signal appearing on line 279 appears on pin 13 to enable NAND gate 588. Since input pin 12 of NAND gate 588 is connected to the set output pin 8 of the separation flip flop 592, which pin is at +5 volts, the NAND gate 588 conducts to provide a ground potential signal at its output pin 11 which enables diode 534 to conduct, thereby resetting the scan flip flop 528, via its direct reset pin 6. The resetting of flip flop 528 causes its set output pin 9 to go to ground potential while its reset output pin 8 goes to +5 volts. Since the search flip flop 526 has its direct reset pin 2 connected to the direct reset input pin 6 of the scan flip flop 528, the search flip flop 526 also resets, whereupon its set output pin 12 goes to ground potential and its reset output pin 13 goes to +5 volts. Upon the resetting of the scan flip flop 528, the ground signal appearing on its set output pin 9 is provided, via line 268, to the speed control circuitry 266. This action stops the operation of the motor. At the same time the +5 volt signal appearing on reset output pin 8 of the scan flip flop 528 is provided, via line 280, to the solid state relay 282 to cause the relay to stop operation of the strip chart recorder 34. In addition, upon the resetting of scan flip flop 528 the ground signal appearing on its set output pin 9 appears on line 244. Since line 244 is connected to input pin 5 of NAND gate 390 in the discriminator the resetting of the scan flip flop disables NAND gate 390, thereby precluding the discriminator from providing any further signals. Accordingly, the total strip register six decade/display 30 and the separation register five decade/display 32 hold to their last reading.

The strip chart recorder is a conventional device such as manufactured by MFE Corporation, model M-12D. The solid state relay is also a conventional device such as made by Magnecraft, model W2QX-1. The details of the relay is not shown in the drawing herein, but such a relay is operative, as noted heretofore, when provided with a ground potential enable signal to its input line 280 to pass AC power, via line 284, to the strip chart recorder. The strip chart recorder is arranged such that when energized, via line 284, from the solid state relay, it provides a graphical display of the analog signal provided from the linear rate meter.

The details of the motor speed control circuit 266 and the drive motor 274 will now be described with reference to FIG. 8.

The speed control circuit 266 comprises a pair of input transistors 603 and 604. Transistor 603 has its base connected to the common juncture of a pair of resistors 606 and 608. The other side of resistor 608 is connected to the emitter of transistor 603 and to ground while the other side of transistor 606 is connected to input line 268 from the logic circuitry. Line 268 provides the scan speed signal to the speed control circuit. Transistor 604 has its base connected to the common juncture of resistors 610 and 612. The other side of resistor 612 is connected to ground. The other side of resistor 610 is connected to line 264 from the logic circuitry. Line 264 provides the search speed signal to the speed control circuit 266. The collector of transistor 604 is connected to the common juncture of a resistor 614, a capacitor 616 and the base of a transistor 618. The other side of resistor 614 is connected to the wiper arm 620 of a potentiometer 622. Potentiometer 622 is connected between the collector of transistor 603 and the +18 volt bus. The collector of transistor 618 is connected to the +18 volt bus and to the collector of a transistor 624. The emitter of transistor 618 is connected to the base of transistor 624. The other side of capacitor 616 is connected to ground and to one side of capacitor 626. The other side of capacitor 626 is connected to the emitter of transistor 624. The output of the speed control is provided across capacitor 626, via lines 272.

As will be appreciated by those skilled in the art, the transistors 618 and 624 form a Darlington pair and the resistors 608 and 612 ensure that the associated transistors 603 and 604 remain off when no signals are provided through their associated resistors 606 and 610, respectively. Transistor 604 acts as an inhibit transistor, that is it either precludes the motor from rotating at all or enables the motor to rotate at the high rate of speed which occurs during the search cycle. To that end, during the search cycle the transistor has a ground level signal applied, via its input line 264, from the logic circuitry. Accordingly, transistor 604 does not conduct. Similarly, the ground signal appearing on line 268 from the logic circuitry causes transistor 602 to be off. Accordingly, the +18 volt signal appears at the base of transistor 618 which causes it to conduct, thereby rendering transistor 624 conductive. This action places the +18 volts across the capacitor 626 and hence, via lines 272 to the motor 274. The motor is a conventional DC motor which is arranged to rotate at a maximum speed when provided with the +18 volts, via lines 272. Accordingly, during the search mode of operation the motor rotates at its maximum speed.

When the logic circuitry, as described heretofore, provides a scan signal, that is when the scan flip flop 528 sets the +5 volt signal appearing on its set output pin 9 is provided, via line 268 and resistor 606, to the base of transistor 603. This action causes transistor 603 to conduct which applies a voltage to the base of transistor 618 proportional to the potentiometer setting on the voltage divider formed by the potentiometer 622 and the resistor 614. The voltage appearing on the output of the Darlington pair, that is across capacitor 626, is proportional to the voltage applied to the base of resistor 618. Accordingly, the DC motor operates at a reduced voltage level during the scan mode of operation, thereby rotating slower. The capacitor 626 provides a filter function for the speed control circuit 266.

As can be seen in FIG. 8, a capacitor 627 is connected across motor 274. The capacitor 627 serves to suppress brush transients.

At the completion of the scan cycle, that is when the scan flip flop 528 and the search flip flop 526 reset, the +5 volt signal appearing on pin 13 of the search flip flop 526 is provided to the base of transistor 604, via line 264. This action causes the transistor to commence conducting, thereby clamping the base of the transistor 618 to ground. This action precludes the Darlington pair from applying any voltage to the DC motor and the DC motor 274 ceases rotation.

The photo source/sensors 276 comprising the beginning of strip source/sensor 84, the separation source/sensor 80 and the end of strip source/sensor 82 are shown in detail in FIG. 9. Each of the source/sensors is of identical construction. Therefore, FIG. 9 only shows the details of the beginning of strip source/sensor 84. As can be seen, the beginning of strip source/sensor comprises a combined photoelectric source and sensor, such as the Texas Instrument Model TIL-139. This component is identified by reference numeral 628 and consists of a light emitting diode 630 and a phototransistor 632. The light emitting diode is arranged to produce infrared light, while the phototransistor mounted adjacent thereto is operative to conduct upon receipt of such light. As can be seen, the cathode of the light emitting diode 630 is connected to ground and the anode is connected to one side of a resistor 634. The other side of resistor 634 is connected to the common juncture of the +5 volt bus, one side of a resistor 636 and the collector of a transistor 638. The other side of resistor 636 is connected to the common juncture of the base of transistor 638 and the collector of the phototransistor 632. The emitter of the phototransistor 632 is connected to ground and to one side of a resistor 640. The other side of resistor 640 is connected to the emitter of transistor 638 and to the input of a schmidt trigger 642. The schmidt trigger is a conventional circuit and forms one part of a composite integrated circuit such as a SN7414N made by Texas Instruments. The other output of schmidt trigger 642 is connected to the input of another schmidt trigger 644 whose output is connected to line 278, the input to the logic circuit 208. The schmidt trigger 644 is also of conventional construction and forms another part of the composite integrated circuit forming schmidt trigger 642.

Operation of the beginning of strip source/sensor is as follows: the light emitting diode 630 produces an infrared signal which bounces off the sample holder supporting the chromatagram strip. The reflected light is received by the photo transistor 632. This action causes the photo transistor 632 to conduct, thereby clamping the base of transistor 638 to ground, whereupon transistor 638 is off. When the carrier has rotated to the position wherein the beginning of strip marker 90 is opposite to the sensor 628 the marker prevents the light produced by the light emitting diode 630 from reflecting back to the phototransistor 632. Accordingly, the phototransistor 632 ceases conducting. This action renders transistor 638 conductive. The conduction of transistor 638 causes the schmidt trigger 642 to provide a sharp negative going output signal. This signal is provided to schmidt trigger 644, which is connected as an inverter, to invert the negative going signal to provide a +5 volt signal on the line 278 and hence to input pin 12 of NAND gate 578 in the logic circuit.

The details of the total strip register six decade/display circuit 30 are shown in FIG. 10. As can be seen, the circuitry comprises six identical interconnected decade/display modules 646, 648, 650, 652, 654 and 656. It should be pointed out at this juncture that the separation register five decade/display circuit 32 is identical to the six decade/display 30 except that it only contains five decade display modules instead of the six shown in FIG. 10.

Each of the decade/displays 646 to 656 is of identical construction. Therefore, only the details of display 646 will be described hereinafter. As can be seen, the display 646 comprises a light emitting diode display 658 and an associated decade decoder drive 660. Each decoder is of conventional construction such as Texas Instrument model SN74143N and each display is of conventional construction such as Texas Instrument model TIL-312. As can be seen, the decoder and driver 660 has its output pin 15 connected to pin 1 of the diode display 658. Pin 1 is the cathode connection for the A segment diode 662 of the alphanumeric light emitting diode display shown in FIG. 10A. In a similar manner pin 16 of the decoder driver is connected to pin 13 of the display 658. Pin 13 is the cathode connection for the diode 662 which forms the B segment of the display. Pin 14 of the decoder driver is connected to pin 10 of the display. Pin 10 is the cathode connection for the diode 662 which forms the C segment of the display. Pin 9 of the decoder driver is connected to pin 8 of the display. Pin 8 is the cathode connection for the diode 662 which forms the D segment. Pin 11 of the driver is connected to pin 7 of the display. Pin 7 is the cathode connection for the diode 662 which forms the E segment. Pin 10 of the decoder driver is connected to pin 2 of the display. Pin 2 is the cathode connection for the diode 662 which forms the F segment. Pin 13 of the decoder driver is connected to pin 11 of the display. Pin 11 is the cathode connection for the diode 662 which forms the G segment of the display. Pins 1, 12, 5 and 23 of the decoder driver are connected to ground. Pin 2 is the input of the decoder driver and is connected to line 256. A resistor 664 is connected between line 206 and the +5 volt bus.

As described heretofore, line 256 is connected to the output of gate 252 and carries the count signals. Pin 3 of the decoder driver 660 is connected to line 206 from the scan push button 42. As noted heretofore, line 206 has a ground signal provided on it when the scan push button is depressed. Accordingly, when the scan push button 42 is depressed all of the decoder drivers in the display are reset.

As will be appreciated by those skilled in the art, each count signal provided on line 256 from the gate 252 causes the decade 660 to increment one digit. This effects the illumination of the connected light emitting diodes 662 in the display 658 to provide a numerical representation of one digit of the count. For example, on the first count the decoder 660 enables the diodes 662 connected to pins 13 and 10 of the diode display 658 to conduct. The diodes connected to pins 10 and 13, as noted heretofore, make up the segments B and C shown in FIG. 10. Accordingly, on the first count the segments B and C illuminate to provide a visual indication of the digit "1". On the second count the decoder 660 enables the diodes connected to pins 1, 13, 8, 7 and 11 to conduct, thereby illuminating the segments A, B, G, E and D to provide a visual indication of the digit "2".

When the decade 660 has completed 10 counts a count signal appears at its output pin 22. As can be seen, output pin 22 is connected to the input pin 2 of the next display module 648 so as to increment the display in that module. Each succeeding module operates in the same manner as described heretofore.

The following table is indicative of various component values for the circuitry of the instant invention. The values for resistor and potentiometer components are given in kilohms and the value of capacitors in microfarads, unless otherwise shown. Solid state components are identified by their manufacturer and/or identification numbers:

| REFERENCE NO. | COMPONENT | VALUE OR MANUFACTURER AND MODEL NO. |
|---|---|---|
| 248 | NAND gate | ¼ of Texas Instruments, SN7400N Composite Integrated Circuit |
| 252 | NAND gate | ¼ of Texas Instruments, SN7400N Composite Integrated Circuit |
| 274 | Motor | Barber-Colman, CYQM-23410-61 |
| 282 | Solid State Relay | W2QX-1, Magnecraft |
| 300 | Geiger-Muller Tube | 18504, Amperex |
| 306 | Transformer | M-8149, Microtran |
| 310 | Diode | Erie, HV40-E |
| 312 | Resistor | 10 Meg. ohms |
| 314 | Capacitor | .01 µf at 1KV, ceramic disc |
| 320 | Capacitor | 100 µf at 35 WVDC, Electrolytic |
| 322 | Resistor | 15 ohms |
| 324 | Resistor | 1 |
| 328 | Transistor | Motorola, 2N3904 |
| 332 | Capacitor | .005 at 1KV, ceramic disc |
| 334 | Resistor | 100 ohms |
| 336 | Potentiometer | 5 Spectrol, 43P502 |
| 340 | Operational Amplifier | Texas Instruments, SN72710-N |
| 344 | Resistor | 10 |
| 346 | Diode | General Electric, 1N4148 |
| 348 | Diode | General Electric, 1N4148 |

-continued

| REFERENCE NO. | COMPONENT | VALUE OR MANUFACTURER AND MODEL NO. |
|---|---|---|
| 350 | Resistor | 10 |
| 352 | Capacitor | 10 pf at 1KV, ceramic disc |
| 356 | Resistor | 510 |
| 359 | Resistor | 10 |
| 360 | Capacitor | .01 at 25VDC, ceramic disc |
| 364 | Potentiometer | 5 Spectrol, 43P502 |
| 366 | Diode | G.E., 1N4148 |
| 368 | Resistor | 15 |
| 370 | NAND gate | ½ of Texas Instruments, SN7410-N Composite Integrated Circuit |
| 376 | Switch | 7101-A, C & K |
| 378 | Resistor | 1 |
| 380 | Resistor | 1 |
| 388 | NAND gate | ½ of Texas Instruments, SN7410-N Composite Integrated Circuit |
| 390 | NAND gate | ½ of Texas Instruments, SN7410-N Composite Integrated Circuit |
| 392 | Flip Flop | ½ of Texas Instruments, SN7473N Composite Integrated Circuit |
| 394 | Resistor | 3.3 |
| 396 | Transistor | Motorola, 2N3904 |
| 398 | Transistor | Motorola, 2N3904 |
| 400 | Resistor | 5.1 |
| 402 | Potentiometer | 5 Spectrol, 43P502 |
| 404 | Potentiometer | 5 Spectrol, 43P502 |
| 406 | Potentiometer | 5 Spectrol, 43P502 |
| 408 | Potentiometer | 5 Spectrol, 43P502 |
| 410 | Potentiometer | 5 Spectrol, 43P502 |
| 412 | Capacitor | .1 µf, Cornell, WMF-05P1 |
| 414 | Capacitor | .033 µf, Cornell, WMF-1S33 |
| 416 | Capacitor | .01 µf, Cornell, WMF-1S1 |
| 418 | Capacitor | .001 µf, Cornell, WMF-1D1 |
| 420 | Capacitor | .001 µf, Cornell, WMF-1D1 |
| 434 | Diode | General Electric, 1N4148 |
| 436 | Diode | General Electric, 1N4148 |
| 438 | Resistor | 10 |
| 440 | Operational Amplifier | Texas Instruments, SN72709N |
| 442 | Capacitor | .5 µf, Cornell, WMF-05P5 |
| 444 | Resistor | 1 Meg. ohm |
| 446 | Capacitor | 200 pf, at 1KV, ceramic disc |
| 448 | Capacitor | .001 µf, at 1KV, ceramic disc |
| 450 | Resistor | 1.5 |
| 454 | Potentiometer | 10 Spectrol, 43P103 |
| 456 | Diode | General Electric, 1N4148 |
| 458 | Resistor | 15 |
| 460 | Diode | General Electric, 1N4148 |
| 462 | Resistor | 15 |
| 464 | Resistor | 10 K |
| 466 | Resistor | 100 ohms |
| 468 | Relay | Magnecraft, W171-DIP-7 |
| 470 | Relay | Magnecraft, W171-DIP-7 |
| 472 | Relay | Magnecraft, W171-DIP-7 |
| 474 | Relay | Magnecraft, W171-DIP-7 |
| 476 | Relay | Magnecraft, W171-DIP-7 |
| 478 | BCD Decoder | Texas Instruments, SN7442N |
| 480 | BCD Counter | Texas Instruments, SN7490N |
| 482 | Resistor | 2 |
| 484 | Resistor | 2 |
| 486 | Diode | General Electric, 1N4148 |
| 488 | Diode | General Electric, 1N4148 |
| 490 | Operational Amplifier | Texas Instruments, SN72702N |
| 492 | Resistor | 510 |
| 494 | Resistor | 1 |
| 496 | Resistor | 3.3 |
| 498 | Transistor | Motorola, 2N3904 |
| 500 | Potentiometer | 5 Spectrol, 43P502 |
| 502 | Resistor | 240 ohms |
| 504 | Resistor | 2 |
| 506 | Flip Flop | ½ of Texas Instruments, SN7374N Composite Integrated Circuit |
| 508 | Diode | General Electric, 1N4148 |
| 509 | Relay | Magnecraft, W171-DIP-7 |
| 510 | Diode | General Electric, 1N4148 |
| 512 | Capacitor | .5 µf Cornell, WMF-05P5 |
| 514 | One Shot | Texas Instruments, SN74121N |
| 516 | Resistor | 220 |
| 518 | Capacitor | .1 µf at 10VDC, ceramic disc |
| 522 | Capacitor | .1 µf at 10VDC, ceramic disc |
| 524 | Resistor | 10 |
| 526 | Flip Flop | ½ of Texas Instruments, SN7473N Composite Integrated Circuit |
| 528 | Flip Flop | ½ of Texas Instruments, SN7473N Composite Integrated Circuit |
| 532 | Diode | General Electric, 1N4148 |
| 534 | Diode | General Electric, 1N4148 |

-continued

| REFERENCE NO. | COMPONENT | VALUE OR MANUFACTURER AND MODEL NO. |
|---|---|---|
| 536 | Resistor | 1 |
| 538 | Diode | General Electric, 1N4148 |
| 540 | Capacitor | 100 µf at 6.3VDC, Electrolytic |
| 542 | Resistor | 12 |
| 544 | Flip Flop | ½ of Texas Instruments, SN7474N Composite Integrated Circuit |
| 546 | Flip Flop | ½ of Texas Instruments SN7474N Composite Integrated Circuit |
| 552 | NAND gate | ¼ of Texas Instruments, SN7400N Composite Integrated Circuit |
| 554 | NAND gate | ¼ of Texas Instruments, SN7400N Composite Integrated Circuit |
| 558 | Divide By Sixteen | Texas Instruments, SN7493N |
| 560 | One Shot | Texas Instruments, SN74121N |
| 561 | NAND gate | ¼ of Texas Instruments, SN7400N Composite Integrated Circuit |
| 562 | Capacitor | .01 µf at 10VDC, ceramic disc |
| 563 | NAND gate | ¼ of Texas Instruments, SN7400N Composite Integrated Circuit |
| 564 | Resistor | 10 |
| 565 | NAND gate | ¼ of Texas Instruments, SN7400N Composite Integrated Circuit |
| 566 | Resistor | 3.3 |
| 567 | Resistor | 1 |
| 568 | Resistor | 1 |
| 569 | Transistor | Motorola, 2N3904 |
| 570 | Diode | General Electric, 1N4148 |
| 571 | Transistor | RCA, 2N3053 |
| 573 | Resistor | 300 ohms |
| 578 | NAND gate | ¼ of Texas Instruments, SN7400N Composite Integrated Circuit |
| 580 | NAND gate | ¼ of Texas Instruments SN7400N Composite Integrated Circuit |
| 584 | NAND gate | ¼ of Texas Instruments, SN7400N Composite Integrated Circuit |
| 588 | NAND gate | ¼ of Texas Instruments, SN7400N Composite Integrated Circuit |
| 592 | Flip Flop | Texas Instruments, SN7472-N |
| 594 | One Shot | Texas Instruments, SN74121-N |
| 595 | NAND gate | ¼ of Texas Instruments, SN7400N Composite Integrated Circuit |
| 596 | Capacitor | 10 µf at 6.3VDC, Electrolytic |
| 598 | Resistor | 10 |
| 600 | Resistor | 240 ohms |
| 602 | LED | Opcoa, LSM-3 |
| 603 | Transistor | Motorola, 2N3904 |
| 604 | Transistor | Motorola, 2N3904 |
| 606 | Resistor | 3.3 |
| 608 | Resistor | 1 |
| 610 | Resistor | 3.3 |
| 612 | Resistor | 1 |
| 614 | Resistor | 1 |
| 616 | Capacitor | 10 µf at 6.3VDC, Electrolytic |
| 618 | Transistor | Motorola, 2N3904 |
| 622 | Potentiometer | 4 Spectrol, 43P502 |
| 624 | Transistor | TIP-29A, Texas Instruments |
| 626 | Capacitor | 100 µf at 35VDC, Electrolytic |
| 627 | Capacitor | 1µf at 35VDC, Electrolytic |
| 628 | photo source/sensor | Texas Instruments, TIL-139 |
| 634 | Resistor | 100 ohms |
| 636 | Resistor | 31 |
| 638 | Transistor | Motorola, 2N3904 |
| 640 | Resistor | 1 |
| 642 | Schmidt trigger | ¼ of Texas Instruments, SN7414N Composite Integrated Circuit |
| 644 | Inverter | ¼ of Texas Instruments, Sn7414N Composite Integrated Circuit |
| 658 | LED Numerical Display | Texas Instruments, TIL-312P |
| 660 | Decade/Decoder | Texas Instruments, SN74143N |
| 664 | Resistor | 100 ohms |

As should be appreciated from the foregoing, the apparatus of the instant invention is ideal for testing many forms of radioisotope compounds.

In this connection, processed chromatagram strips can be automatically scanned by the apparatus and the chemical structure of the radiopharmaceutical analyzed. A permanent record, in the form of a hard copy printout, is produced by the strip chart recorder and displays the spectral information in graph form to document the results of the analysis. The digital data obtained and displayed by the apparatus enable one to compute the percentage of breakdown of the compound under test. Once the chemical state has been determined, a prediction may be made of proper or improper biological behavior, prior to its use in a patient.

The apparatus of the instant invention provides the physician, radio chemist and nuclear technician with a fully automated, easy to use system. To that end, an entire automated program is initiated by the pushing of a single command button. This action starts the automatic operation of the system such that within minutes the sample strip is scanned, the data accumulated and displayed.

By virtue of the search cycle performed by the apparatus, the chromatagram test strip is prescreened and any sample which would not produce statistically valid information is rejected. Needless to say, this feature is of extreme importance since it guards against poor results and ensures the production of high quality information.

The automated apparatus of the instant invention overcomes various technical problems inherent in manual and partially automated systems now in use. For example, due to the auto ranging feature of the apparatus of the system of the instant invention, system overload is obviated. Due to the fact that the strip is sealed while wet on the carrier operational delays are minimized and problems or oxidation resulting from the necessity of drying the strips is obviated. In addition, the contamination of equipment and work areas are minimized.

Perhaps one of the most important features of the instant invention from a utility standpoint is its ability to provide a graphical representation of the spectral distribution of the radioactivity along the strip. Personnel can be readily trained to immediately recognize the existence of a properly tagged pharmaceutical from a quick inspection of the graph produced.

Without further elaboration, the foregoing will so fully illustrate my invention that others may, by applying current or future knowledge, readily adapt the same for use under various conditions of service.

What is claimed as the invention is:

1. Apparatus for automatically scanning processed chromatagrams of radiopharmaceuticals to provide an indication of the biological behavior thereof, comprising: sample carrier means for receiving a processed chromatagram, radioactivity detecting means for counting radioactive emissions of samples disposed adjacent thereto, said carrier means being moved relative to said radioactivity detector so that said detector traverses said chromatagram to count the radioactive emissions thereof and provide output signals indicative of the spectral distribution of the radioactivity along the chromatagram, display means responsive to said output signal to provide a digital readout of the number of emissions detected in the entire chromatagram as well as the number of emissions detected within a preselected portion thereof.

2. The apparatus of claim 1 additionally comprising recorder means responsive to said output signals for providing a graphic record of the spectral distribution of radioactive emissions across the entire chromatagram.

3. The apparatus of claim 2 wherein said processed chromatagram is scanned while wet, said carrier comprising sealing means for sealing said wet chromatagram therein and on said carrier means.

4. The apparatus of claim 3 wherein said sealing means comprises plastic tape.

5. The apparatus of claim 3 wherein said carrier means comprises a rotatable wheel, with said tape holding said chromatagram on the periphery of said wheel.

6. The apparatus of claim 2 additionally comprising logic means coupled to said carrier and said detector to cause said carrier to move relative to said detector in a first pass to determine if said chromatagram is capable of providing statistically valid information and for causing said carrier to move relative to said detector on a second pass to provide said output signals if the chromatagram is so capable.

7. The apparatus of claim 6 wherein said logic means includes means for monitoring peak count rates of the radioactive emissions sensed by said detector during the first pass and for enabling the carrier to start said second pass if the peak count rate is above a first predetermined value and below a second predetermined value.

8. The apparatus of claim 7 wherein said recorder means comprises a strip chart recorder and wherein said apparatus also includes means responsive to said output signals during said first pass for selecting one of several predetermined count rate ranges to accumulate count data on.

9. The apparatus of claim 8 wherein said detector comprises a geiger muller tube for providing signals indicative of the radioactive emissions detected, said apparatus additionally comprising discriminator means responsive to said detector for providing said output signals when the signals from said geiger muller tube exceed a predetermined level.

10. The apparatus of claim 9 additionally comprising sensing means for sensing the position of said carrier relative to said detector.

11. The apparatus of claim 10 wherein said sensing means comprises photoelectric means.

12. The apparatus of claim 11 wherein said photoelectric means is arranged to sense a mark on said carrier indicating the completion of a pass to provide a stop command to said logic means stopping the operation of said apparatus and causing the counting to cease and the marking of the strip chart produced by said recorder with a mark indicating the end of the graphic display of one pass.

13. Apparatus for automatically scanning processed chromatagrams of radiopharmaceuticals to provide an indication of the biological behavior thereof, comprising: sample carrier means for receiving a processed chromatagram, radioactivity detecting means for counting radioactive emissions of samples disposed adjacent thereto, said carrier means being moved relative to said radioactivity detector so that said detector traverses said chromatagram to count the radioactive emissions thereof and provide output signals indicative of the spectral distribution of the radioactivity along the chromatagram, recorder means responsive to said output signals for providing a graphic record of the spectral distribution of radioactive emissions across the entire chromatagram.

* * * * *